(12) United States Patent
Michael

(10) Patent No.: US 12,633,731 B2
(45) Date of Patent: May 19, 2026

(54) CABLE MANAGEMENT IN EV CHARGER SYSTEMS

(71) Applicant: SHOALS TECHNOLOGIES GROUP, LLC, Portland, TN (US)

(72) Inventor: Dorothy Michael, Greenbrier, TN (US)

(73) Assignee: SHOALS TECHNOLOGIES GROUP, LLC, Portland, TN (US)

( * ) Notice: Subject to any disclaimer, the term of this patent is extended or adjusted under 35 U.S.C. 154(b) by 87 days.

(21) Appl. No.: 18/475,050

(22) Filed: Sep. 26, 2023

(65) Prior Publication Data

US 2024/0014641 A1 Jan. 11, 2024

Related U.S. Application Data

(63) Continuation-in-part of application No. 18/301,096, filed on Apr. 14, 2023, which is a continuation-in-part
(Continued)

(51) Int. Cl.
| | |
|---|---|
| *H02G 3/04* | (2006.01) |
| *B60L 53/31* | (2019.01) |
| *H02J 3/38* | (2006.01) |

(52) U.S. Cl.
CPC ............ *H02G 3/0437* (2013.01); *B60L 53/31* (2019.02); *H02J 3/38* (2013.01); *H02J 2300/24* (2020.01)

(58) Field of Classification Search
CPC .......... H02G 3/0437; B60L 53/31; H02J 3/38; H02J 2300/24
See application file for complete search history.

(56) References Cited

U.S. PATENT DOCUMENTS

| | | | | |
|---|---|---|---|---|
| 2,821,154 A | * | 1/1958 | Tennison, Jr. | ........ E04D 13/068 |
| | | | | 405/122 |
| 2,823,056 A | * | 2/1958 | Di Meo | .................... F16L 3/26 |
| | | | | 403/376 |

(Continued)

FOREIGN PATENT DOCUMENTS

| | | |
|---|---|---|
| CA | 2985303 A1 | 5/2012 |
| CH | 463594 A | 10/1968 |

(Continued)

OTHER PUBLICATIONS

International Search Report and Written Opinion for International Application No. PCT/US3/0176508 mailed Aug. 2, 2023, 9 pgs.
(Continued)

*Primary Examiner* — Terrell L McKinnon
*Assistant Examiner* — Ding Y Tan
(74) *Attorney, Agent, or Firm* — Maschoff Brennan

(57) ABSTRACT

In an example, a raceway joint may include a base wall, sidewalls, retention flanges, and a raceway separator. The sidewalls may be coupled to the base wall. The base wall and the sidewalls may at least partially define a raceway opening configured to receive raceways. The retention flanges may extend from the sidewalls. The retention flanges may be configured to interface with the raceways to prevent the raceway joint from moving along a direction that is substantially parallel to the sidewalls. The raceway separator may extend from the base wall into the raceway opening. The raceway separator may be configured to interface with the raceways to prevent the raceways from being inserted into the raceway opening beyond a point along a width of the base wall and to prevent the raceway joint from moving relative to the raceways.

20 Claims, 26 Drawing Sheets

Related U.S. Application Data of application No. 18/295,830, filed on Apr. 4, 2023, now Pat. No. 12,313,195.

(60) Provisional application No. 63/377,176, filed on Sep. 26, 2022, provisional application No. 63/362,737, filed on Apr. 8, 2022.

(56) References Cited

U.S. PATENT DOCUMENTS

| | | | | |
|---|---|---|---|---|
| 3,841,101 | A * | 10/1974 | Henfrey | E04D 13/068 |
| | | | | 405/122 |
| 4,954,015 | A * | 9/1990 | McGowan | E04D 13/068 |
| | | | | 52/11 |
| D427,048 | S | 6/2000 | Potter et al. | |
| 6,216,746 | B1 * | 4/2001 | Guebre-Tsadik | H02G 3/0608 |
| | | | | 138/158 |
| 6,249,636 | B1 | 6/2001 | Daoud | |
| 6,353,697 | B1 | 3/2002 | Daoud | |
| 6,424,779 | B1 * | 7/2002 | Ellison | G02B 6/4459 |
| | | | | 385/134 |
| 6,450,458 | B1 * | 9/2002 | Bernard | H02G 3/0608 |
| | | | | 403/387 |
| 6,512,875 | B1 * | 1/2003 | Johnson | H02G 3/0608 |
| | | | | 248/228.4 |
| 6,634,605 | B2 * | 10/2003 | Bernard | H02G 3/0608 |
| | | | | 403/387 |
| 6,701,056 | B2 | 3/2004 | Burek et al. | |
| 6,739,795 | B1 * | 5/2004 | Haataja | G02B 6/4459 |
| | | | | 403/387 |
| 6,771,871 | B2 | 8/2004 | Krampotich et al. | |
| 7,542,650 | B2 * | 6/2009 | Ellison | G02B 6/4459 |
| | | | | 248/65 |
| 7,712,709 | B2 | 5/2010 | Winchester | |
| 7,742,675 | B2 * | 6/2010 | Sayres | H02G 3/0608 |
| | | | | 248/68.1 |
| 7,952,027 | B2 | 5/2011 | Greick | |
| 8,186,633 | B2 * | 5/2012 | Ferris | H02G 3/0608 |
| | | | | 403/325 |
| 8,262,035 | B2 | 9/2012 | Bleus et al. | |
| 9,288,922 | B2 | 3/2016 | Liu et al. | |
| D755,043 | S | 5/2016 | Bailey | |
| 9,411,117 | B1 | 8/2016 | Goodsell et al. | |
| 9,618,143 | B2 | 4/2017 | Noble | |
| 9,841,123 | B1 | 12/2017 | White | |
| 9,841,179 | B2 * | 12/2017 | Williams | H02G 3/0608 |
| 9,888,603 | B1 | 2/2018 | Vargas | |
| 10,114,189 | B2 * | 10/2018 | Ferris | H02G 3/0608 |
| 10,123,449 | B1 | 11/2018 | Stevens et al. | |
| 10,152,852 | B2 * | 12/2018 | Knaggs | H04B 10/2575 |
| 10,302,228 | B2 | 5/2019 | Costigan | |
| 10,367,340 | B2 * | 7/2019 | Bae | H02G 3/0412 |
| 10,670,169 | B2 | 6/2020 | Etheridge et al. | |
| 11,125,358 | B2 | 9/2021 | Leeson et al. | |
| D974,879 | S | 1/2023 | Wu | |
| 11,692,610 | B2 | 7/2023 | Tsorng et al. | |
| 11,942,772 | B2 | 3/2024 | Ehmann et al. | |
| D1,023,295 | S | 4/2024 | Delshad | |
| 12,313,195 | B2 | 5/2025 | Michael et al. | |
| 2003/0177628 | A1 * | 9/2003 | Viklund | H02G 3/0608 |
| | | | | 29/428 |
| 2003/0183732 | A1 * | 10/2003 | Nault | H02G 3/0608 |
| | | | | 248/49 |
| 2008/0041623 | A1 * | 2/2008 | Makwinski | H02G 3/128 |
| | | | | 174/481 |
| 2009/0101762 | A1 | 4/2009 | Young | |
| 2010/0258685 | A1 | 10/2010 | Gardner et al. | |
| 2011/0308046 | A1 | 12/2011 | Weiss | |
| 2012/0318935 | A1 | 12/2012 | Benedetti | |
| 2014/0008123 | A1 | 1/2014 | Pawluk | |
| 2014/0175231 | A1 | 6/2014 | Cox et al. | |
| 2017/0089495 | A1 | 3/2017 | Gundel et al. | |
| 2017/0222412 | A1 * | 8/2017 | Jaeker | H02G 3/0608 |
| 2019/0273346 | A1 * | 9/2019 | Strong | H01R 31/02 |
| 2020/0403390 | A1 | 12/2020 | Jette | |
| 2021/0119427 | A1 * | 4/2021 | Kuffel | H02G 3/045 |
| 2021/0247002 | A1 | 8/2021 | Dallmann | |
| 2022/0060007 | A1 * | 2/2022 | Khairnar | H02G 3/0608 |
| 2023/0322104 | A1 | 10/2023 | Michael et al. | |
| 2023/0323981 | A1 | 10/2023 | Michael et al. | |

FOREIGN PATENT DOCUMENTS

| | | |
|---|---|---|
| CN | 103972827 A | 8/2014 |
| EP | 0569297 A1 | 11/1993 |
| FR | 975405 | 3/1951 |
| GB | 2436641 A | 10/2007 |
| WO | 2018151613 A1 | 8/2018 |

OTHER PUBLICATIONS

Cablofil cable label clip product page https://assets.twacomm.com/assets/pdf/47371.pdf (Year: 2005).

Panduit stackable cable rack spacer datasheet, https://www.panduit.com/content/dam/panduit/en/products/media/3/13/013/8013/8013 Year 2001.

"How to select a suitable anchor fixing" online article by Sungupta dated 03/17/202 from JC Gupta and Sons, https://www.jcfasteners.com/how-to-select-a-suitable-anchor-fixing/ (Year: 2020).

Techline Mfg youtube video titled "Snap Track Installing a Bonding Jumper" dated Jun. 28, 2018, https://www.youtube.com/watch?v=o52eqWOK9tw (Year: 2018).

WKK push mount cable ties youtube video dated Jun. 8, 2020, https://www.youtube.com/watch?v=PLTmxtUJRrQ Year 2020.

Extended European Search report mailed Mar. 16, 2026 in related European Patent Application No. 23785349.4.

* cited by examiner

CABLE MANAGEMENT IN EV CHARGER SYSTEMS

CROSS-REFERENCE TO RELATED APPLICATIONS

This application is a continuation-in-part of U.S. patent application Ser. No. 18/301,096 filed on Apr. 14, 2023, which is a continuation-in-part of U.S. patent application Ser. No. 18/295,830, filed on Apr. 4, 2023; which claims the benefit of U.S. Patent Application Ser. No. 63/362,737, filed on Apr. 8, 2022; the disclosures of which are incorporated herein by reference in their entireties. This application claims the benefit of U.S. Patent Application Ser. No. 63/377,176, filed on Sep. 26, 2022, the disclosure of which is incorporated herein by reference in its entirety.

FIELD

The embodiments discussed herein are related to cable management in electric vehicle (EV) charger systems.

BACKGROUND

Unless otherwise indicated herein, the materials described herein are not prior art to the claims in the present application and are not admitted to be prior art by inclusion in this section.

Typical electric vehicles (EVs) operate on large on-board energy storage cells or rechargeable batteries. EV battery capacity limits the distances EVs can travel on a single charge from and/or between a user's home EV charger system and commercial EV charger systems (e.g., charging stations). Commercial EV charger infrastructure has historically included sparsely located EV charger systems at haphazard or ad hoc locations. The sparsity of commercial EV charger infrastructure is an impediment to the widespread adoption of EVs.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, raceway joint includes a base wall, a plurality of sidewalls, a plurality of retention flanges, and a raceway separator. The plurality of sidewalls are coupled to the base wall. The base wall and the plurality of sidewalls at least partially define a raceway opening configured to receive a plurality of raceways. The plurality of retention flanges extend from the plurality of sidewalls. The plurality of retention flanges are configured to interface with the plurality of raceways to prevent the raceway joint from moving along a direction that is substantially parallel to the plurality of sidewalls. The raceway separator extends from the base wall into the raceway opening. The raceway separator is configured to interface with the plurality of raceways to prevent the plurality of raceways from being inserted into the raceway opening beyond a point along a width of the base wall and to prevent the raceway joint from moving relative to the plurality of raceways.

In another example embodiment, a cable management system includes a first raceway, a second raceway, and a raceway joint. The first raceway partially defines a channel configured to receive a cable. The second raceway is configured to be installed proximate the first raceway such that a gap forms between the first raceway and the second raceway and to further define the channel configured to receive the cable. The raceway joint includes a base wall, a plurality of sidewalls, a plurality of retention flanges, and a raceway separator. The base wall is configured to cover at least a portion of the gap to further define the channel configured to receive the cable. The plurality of sidewalls are coupled to the base wall. The base wall and the plurality of sidewalls at least partially define a raceway opening configured to receive the first raceway and the second raceway. The plurality of retention flanges extend from the plurality of sidewalls. The plurality of retention flanges are configured to interface with the first raceway and the second raceway to prevent the raceway joint from moving along a direction that is substantially parallel to the plurality of sidewalls. The raceway separator extends from the base wall into the raceway opening. The raceway separator is configured to interface with the first raceway and the second raceway to prevent the first raceway and the second raceway from being inserted into the raceway opening beyond a point along a width of the base wall and to prevent the raceway joint from moving relative to the first raceway and the second raceway.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Approximately half of an EV infrastructure deployment cost is associated with temporal aspects of the deployment: power entry equipment, cables, skids, extensive civil work, and long cable runs and connectors. To meet EV deployment goals, charge point operators need to speed deployment while simultaneously reducing costs. Embodiments herein relate to a cable management system that may be implemented in EV infrastructure deployments and that may speed deployment and/or reduce cost compared to other cable management systems.

An example cable management system includes one or more multicable clips, one or more retention plates, one or more risers, and/or a cable raceway. Each multicable clip includes multiple cradles to receive and secure cables, such as EV charger system cables, with a pedestal at each end of the multicable clip to couple the multicable clip to one or more installation surfaces or other installation structures. For example, the pedestals may be used to couple the multicable clip to a floor, wall, ceiling, or other surface. Alternatively or additionally, risers may be used to stack multiple multicable clips together, with each riser being coupled between corresponding pedestals of two multicable clips spaced apart by the riser. After cables are positioned in cradles of a given multicable clip, a corresponding retention plate may be coupled to the multicable clip to secure the cables within the cradles of the multicable clip. Each retention plate may include spacers that block openings of the cradles when the retention plate is coupled to the multicable clip. Each retention plate may additionally include retention plate fingers to secure the retention plate to the multicable clip. The cable raceway may engage with one or more of the multicable clips to at least partially enclose the one or more multicable clips, one or more retention plates, and the cables. For example, the cable raceway may include two retention flanges that engage shoulders formed in pedestals of a given multicable clip. Some embodiments of the cable management systems disclosed herein may be less expensive and take less time to install than other arrangements, such as arrangements in which trenches are dug, cables are installed in the trenches, and the trenches are backfilled.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

Figure 1A:
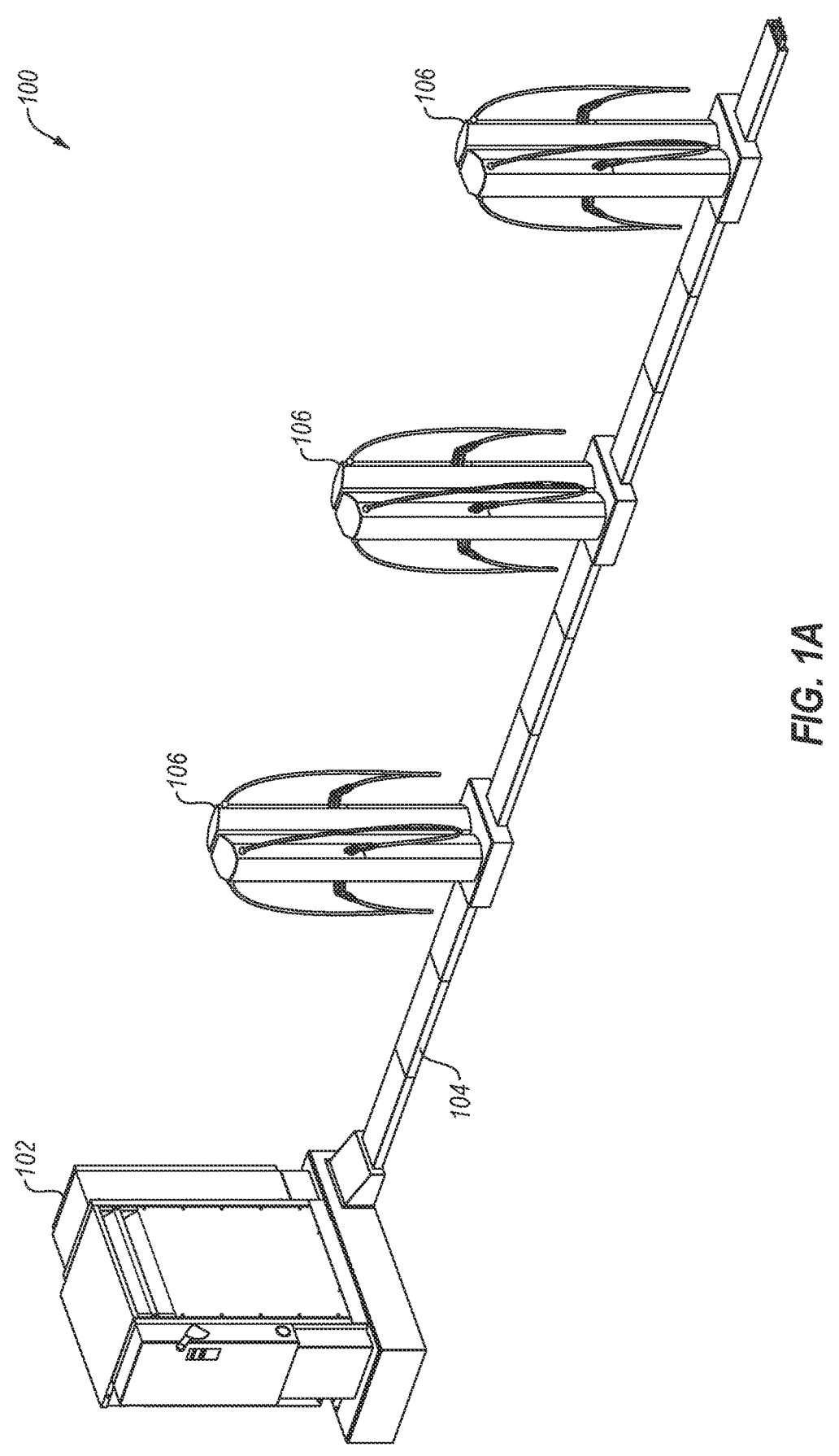
FIG. 1A is a perspective view of an example EV charger system that includes a power conversion device, cable management systems, one or more electrical cables, and one or more charger skids.

FIG. 1A is a perspective view of an example EV charger system 100 that includes a power conversion device 102, cable management systems 104, one or more electrical cables (not shown in FIG. 1A), and one or more charger skids 106, arranged in accordance with at least one embodiment described herein. The power conversion device 102 may be coupled to a power source (not shown), such as a power grid or solar array. The power conversion device 102 may be configured to transform power from the power source for compatibility with EV vehicles and/or the charger skids 106.

The charger skids 106 are electrically coupled through the electrical cables to the power conversion device 102. Each of the charger skids 106 may include one or more EV chargers. As illustrated in FIG. 1A, each charger skid 106 includes four EV chargers. In this and other embodiments, each of the charger skids 106 may be installed at the intersection of four vehicle parking spots or stalls to allow up to four EVs to be charged simultaneously through the charger skid 106.

Each cable management system 104 extends between the power conversion device 102 and one of the charger skids 106 or between two charger skids 106 to house and secure the electrical cables. The cable management systems 104 may eliminate the need for trenching as required in some other EV charger systems as the electrical cables may be installed above ground and protected within the cable management systems 104. Although illustrated in FIG. 1A as being routed on the ground or floor (e.g., of a parking lot, parking structure, or the like), more generally the cable management systems 104 may be routed on any installation surface or structure, such as a floor, a wall, a ceiling, or other installation surface.

Figure 1B:
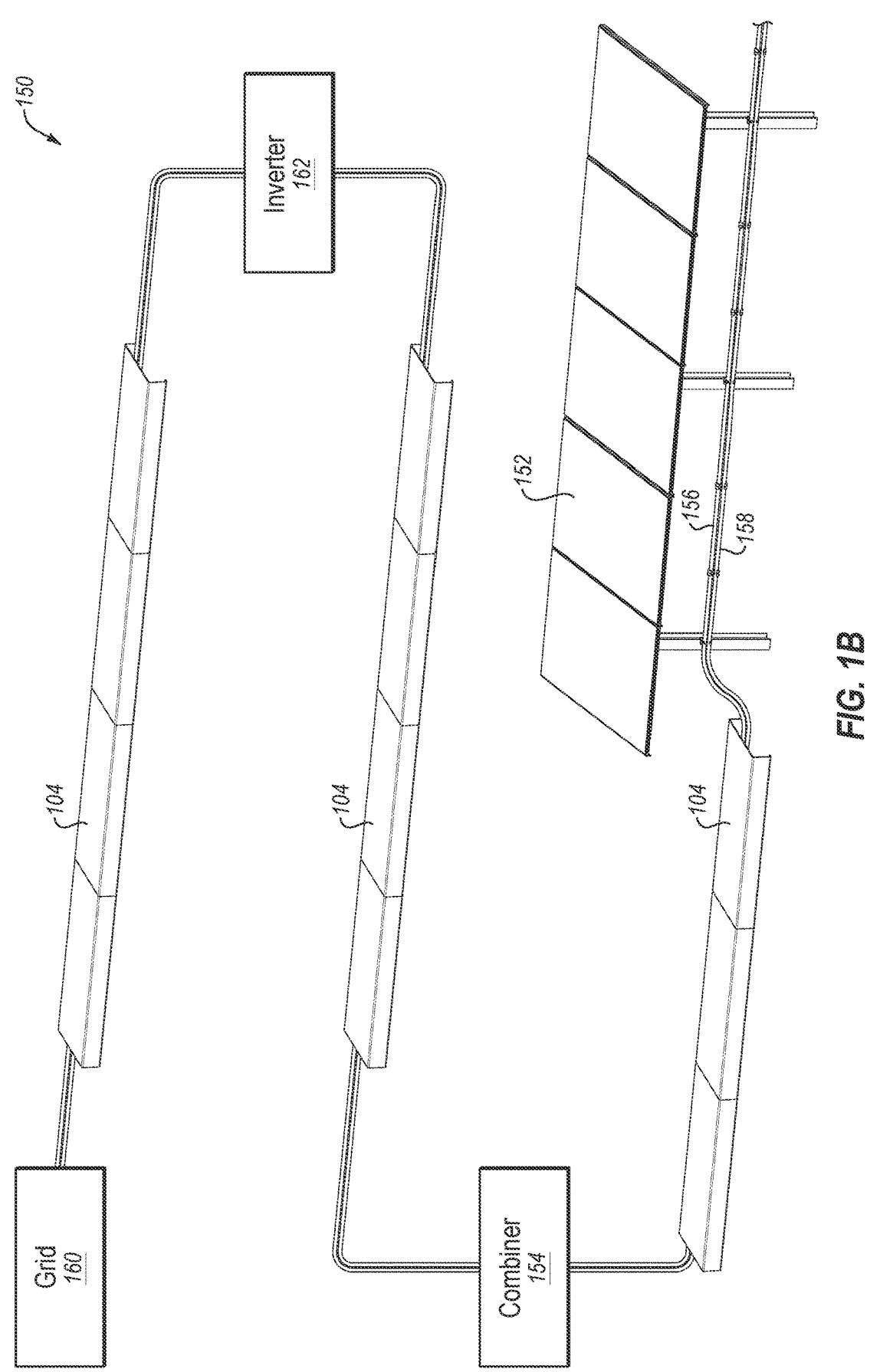
FIG. 1B is an operational diagram of an example PV system.

FIG. 1B is an operational diagram of an example PV system 150, arranged in accordance with at least one embodiment described herein. The PV system 150 includes a solar panel array 152 electrically coupled to a combiner 154 via one or more cables 156, 158, or some combination thereof. The PV system 150 is coupled to a grid 160 through an inverter 162. The solar panel array 152, the combiner 154, and/or the inverter 162 is/are one example of a power source to which the power conversion device 102 may be coupled.

The cables 156, 158 may include drop lines (not illustrated in FIG. 1B) electrically coupled to different solar panels of the solar panel array 152. The drop lines may electrically couple the cables 156, 158 to the different solar panels of the solar panel array 152. In addition, the PV system 150 may include cable management systems 104 to house the cables 156, 158 or other cables/wires/connections between the solar panel array 152, the combiner 154, the inverter 162, and/or the grid 160.

The solar panel array 152 may harvest a flow of energy (e.g., solar radiation) and generate an electrical power signal, which may be passed to the combiner 154 via the cables 156, 158. The combiner 154 may combine the power signal received via the cables 156, 158 to generate a combined power signal. The combiner 154 may provide the combined power signal to the inverter 162. The inverter 162 may convert the combined power signal from a DC power signal to an AC power signal to generate an inverted power signal that is compatible with the grid 160. The inverter 162 may provide the inverted power signal to the grid 160.

The cable management system 104 may extend between the solar panel array 152 and the combiner 154, the combiner 154 and the inverter 162, the inverter 162 and the grid 160, or some combination thereof. In some embodiments, the cable management system 104 may extend from the solar panel array 152 to the combiner 154, the combiner 154 to the inverter 162, the inverter 162 to the grid 160, or some combination thereof on the same installation surface on which the combiner 154, the inverter 162, the grid 160, or some combination thereof is installed or located.

With combined reference to FIGS. 1A and 1B, the cable management system 104 may house and secure at least a portion of the cables, such as the cables 156, 158, to protect them from vehicular traffic, other traffic or loads, or other exposure factors. In addition, the cable management system 104 may permit vehicles or other transportation devices to traverse the cable management system 104.

The cable management system 104 may eliminate the need for grading and/or trenching of the installation surface as required in other power systems. The cable management system 104 may also permit the cables, such as cables 156, 158 to be installed above-ground and protected within the cable management system 104.

Figure 2A:
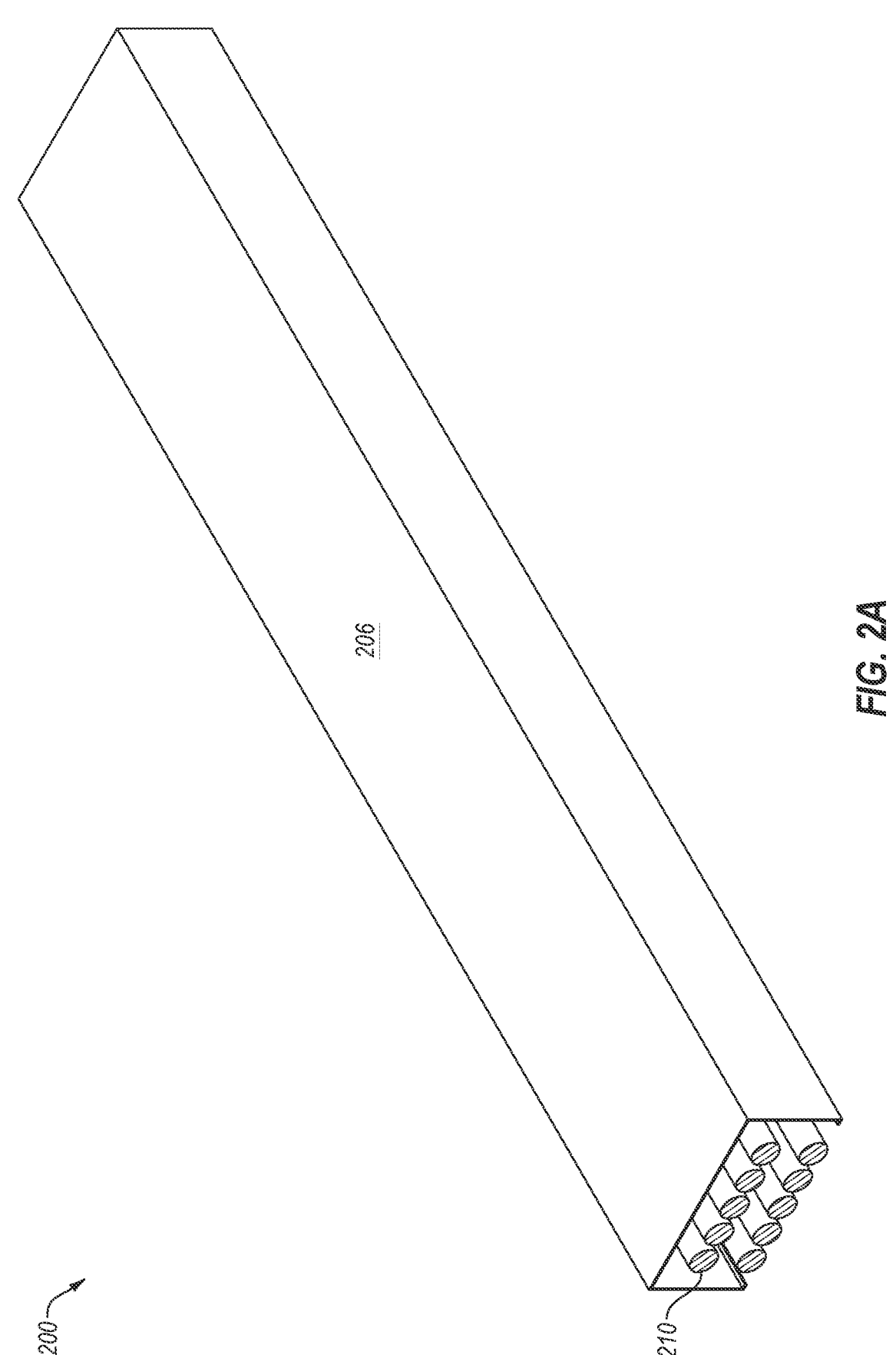
FIGS. 2A-2C illustrate an example cable management system that may be included in the EV charger system of FIG. 1A and/or the PV system of FIG. 1B.
Figure 2B:
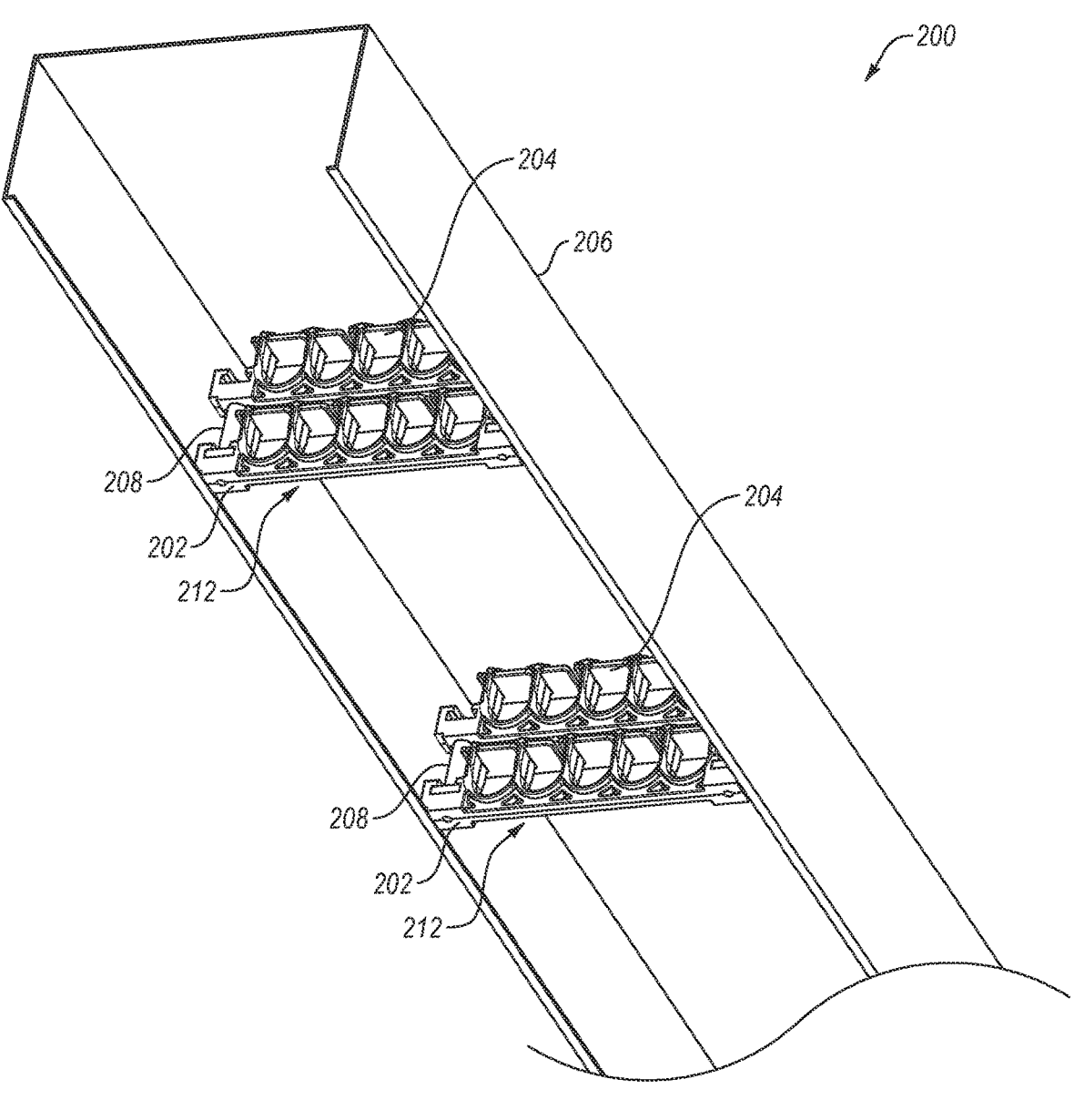
Figure 2C:
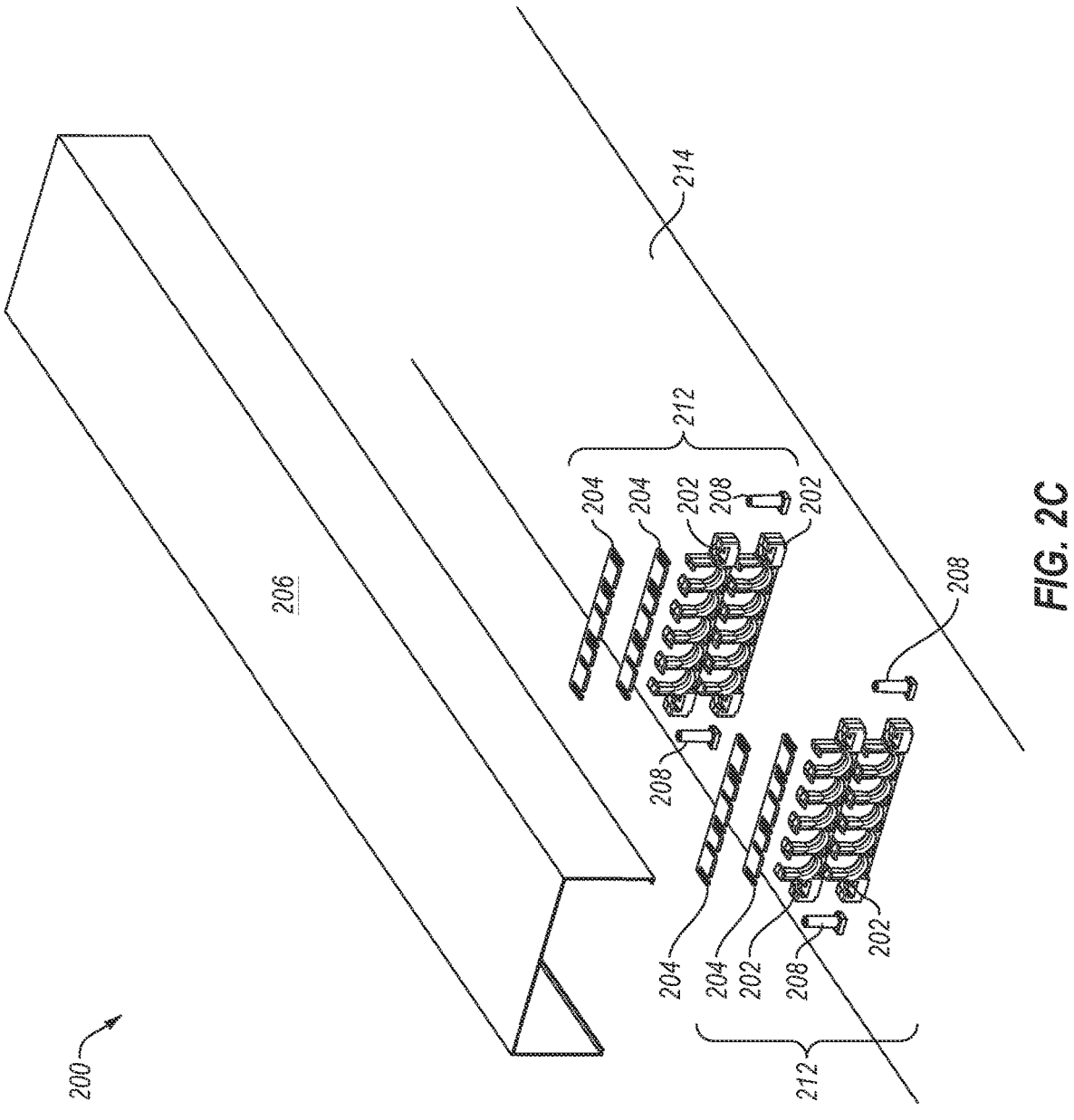

FIGS. 2A-2C illustrate an example cable management system 200 (hereinafter "system 200") that may be included in the EV charger system 100 of FIG. 1A and/or the PV system 150 of FIG. 1B, arranged in accordance with at least one embodiment described herein. The system 200 may include, be included in, or correspond to one or more of the cable management systems 104 of FIG. 1. FIGS. 2A, 2B, and 2C respectively include a top front perspective view, a bottom front perspective view, and an exploded top front perspective view of the system 200. As illustrated, the system 200 may include one or more multicable clips 202, one or more retention plates 204, a cable raceway 206, and/or one or more risers 208. FIG. 2A additionally illustrates example electrical cables 210 ("cables 210) that may be managed by the system 200. Only one of the cables 210 is labeled in FIG. 2A for simplicity. The cables 210 are omitted from FIGS. 2B and 2C for clarity.

Each multicable clip 202 includes multiple cradles to receive and secure multiple cables 210. In particular, each of the multicable clips 202 includes five cradles to receive and secure five cables 210. The retention plates 204 couple to the multicable clips 202 to retain the cables 210 in the cradles after placement therein. As illustrated, each of the multicable clips 202 is stacked with another multicable clip 202 through the risers 208. The risers 208 couple the multicable clips 202 together (optionally with one or more threaded fasteners or other fasteners).

A set of stacked multicable clips 202 together with corresponding retention plates 204 and risers 208 (and optional fasteners) may be referred to herein as a stacked retention assembly 212. Two stacked retention assemblies 212 are at least partially visible in each of FIGS. 2B and 2C. The stacked retention assemblies 212 may be spaced apart along a length of the cable raceway 206 to provide support and management of the cables 210 along the length of the cable raceway 206. For example, the stacked retention assemblies 212 may be spaced every 18 to 24 inches. By stacking multiple multicable clips 202 together, each stacked retention assembly 212 may secure in a single location along the length of the cable raceway 206 more cables 210 than a single multicable clip 202 by itself. The illustrated embodiment depicts ten cables 210 secured by each of the stacked retention assemblies 212 which is twice as many as one of the multicable clips 202 alone.

Within each stacked retention assembly 212, one of the multicable clips 202 will be closer to and/or coupled directly to an installation surface 214 while the other multicable clip(s) 202 is(are) spaced further from the installation surface 214. The multicable clip 202 that is closest to and/or coupled directly to the installation surface 214 may be referred to herein as a base multicable clip 202. The multicable clip(s) 202 that is(are) spaced further from the installation surface 214 than the base multicable clip 202 may be referred to herein as the elevated multicable clip(s) 202 because it is spaced apart from or elevated relative to the installation surface 214. The use of "base" and "elevated" in describing the multicable clips 202 in stacked retention assemblies 212 should not be construed to require that the stacked retention assemblies 212 have a particular orientation relative to any given reference frame. Rather, the use of "base" and "elevated" in describing the multicable clips 202 in stacked retention assemblies 212 is merely used as an aid in distinguishing between the multicable clips 202 in a stacked retention assembly 212 notwithstanding any particular orientation they may have relative to a given reference frame. In FIG. 2C, the installation surface 214 may be a floor or ground (i.e., gravity is down) such that the multicable clip 202 at the bottom of each stacked retention assembly 212 is the base multicable clip 202 while the other multicable clip 202 in each stacked retention assembly 212 is the elevated multicable clip 202.

The cable raceway 206 may be configured to engage at least one of the multicable clips of each stacked retention assembly 212 along its length to at least partially enclose the stacked retention assemblies 212 (or portions thereof) and the cables 210.

Substitutions, modifications, additions, etc. may be made to FIGS. 2A-2C without altering the scope of the disclosure. For example, the system 200 may have a single multicable clip 202 and retention plate 204 at each supported location along the length of the cables 210 instead of a stacked retention assembly 212. Alternatively or additionally, while a height of the cable raceway 206 is illustrated as accommodating a base multicable clip 202 and one elevated multicable clip 202, the height of the cable raceway 206 may be reduced to accommodate a single multicable clip 202 (e.g., a base multicable clip 202 without any elevated multicable clips 202) or increased to accommodate three or more multicable clips 202 (e.g., a base multicable clip 202 with two or more elevated multicable clips 202) in a given stacked retention assembly 212.

Figure 3:
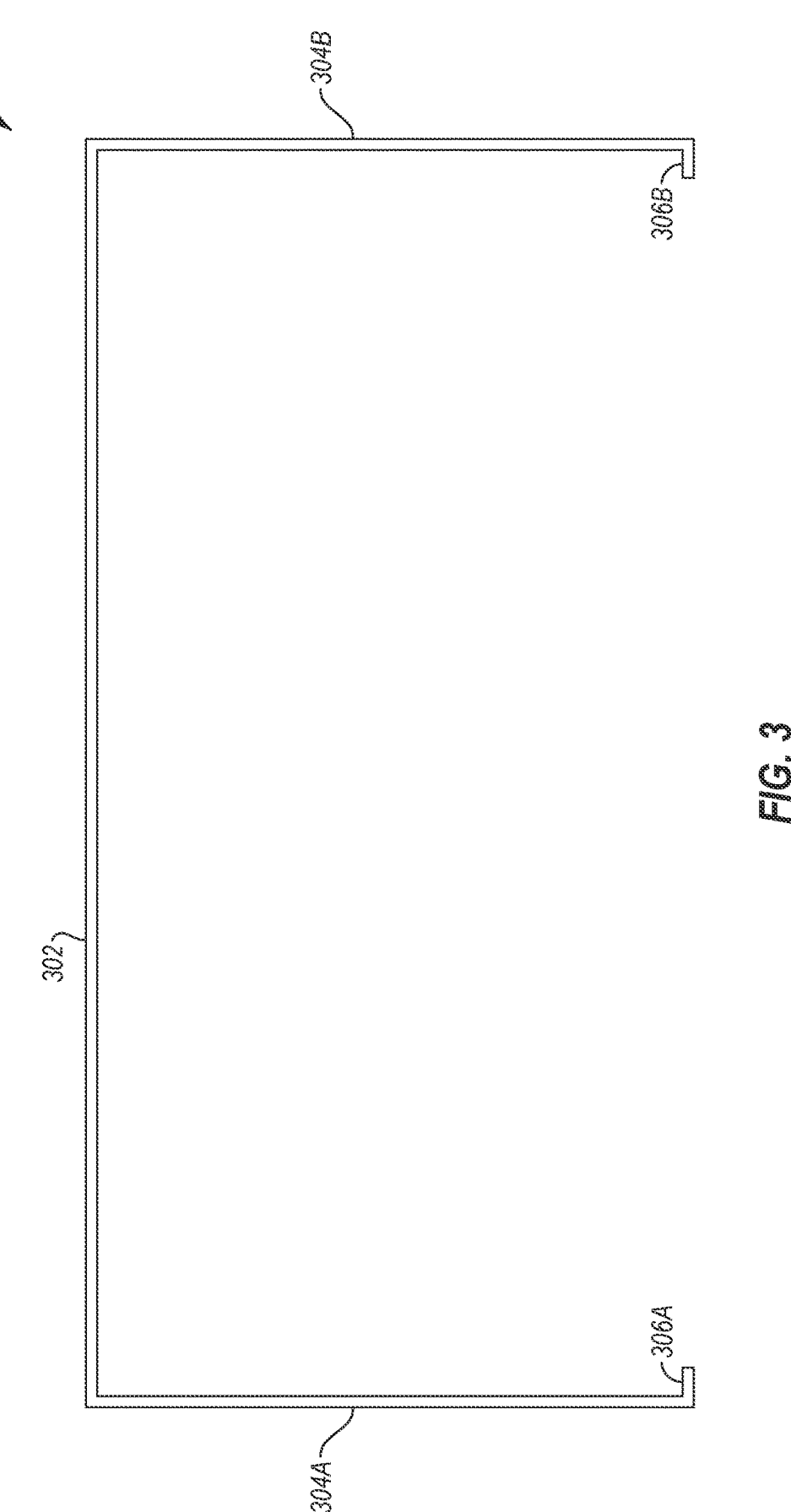
FIG. 3 is a front view of a cable raceway of the cable management system of FIGS. 2A-2C.

FIG. 3 is a front view of the cable raceway 206 of the system 200 of FIGS. 2A-2C, arranged in accordance with at least one embodiment described herein. The cable raceway 206 includes a base wall 302 and first and second sidewalls 304A, 304B (hereinafter collectively "sidewalls 304" or generically "sidewall 304") extending from the base wall 302. As illustrated, the sidewalls 304 extend orthogonally from the base wall 302. In other embodiments, the sidewalls 304 may extend from the base wall 302 at the same or different acute angle(s) or obtuse angle(s).

The cable raceway 206 further includes first and second retention flanges 306A, 306B (hereinafter collectively "retention flanges 306" or generically "retention flange 306"). The retention flanges 306 extend from the sidewalls 304 inward and/or toward each other. Alternatively or additionally, the retention flanges 306 may extend at least partially toward the base wall 302 and/or in other directions. The retention flanges 306 may be configured to engage an installation structure, one or more components of the system 200 such as some or all of the multicable clips 202, or the like. For example, at least the base multicable clip 202 in each stacked retention assembly 212 that is directly coupled to an installation structure may have one or more shoulders formed therein that engage with the retention flanges 306 to secure the cable raceway 302 to the retention assembly 212.

The cable raceway 206 may be made of sheet metal, polyvinyl chloride (PVC) or other plastic, or other suitable material. In some embodiments, the cable raceway 206 may include a resilient material capable of some elastic deformation or flex, e.g., during installation of the cable raceway 206 on a multicable clip 202 or stacked retention assembly 212, while having sufficient strength to support a load up to a threshold (e.g., 500 lbs.) without failing (e.g., collapsing under the load onto cables and/or other components of the system 200 housed therein).

In some embodiments, the sidewalls 304 are separated by a wall-to-wall distance $d_{ww}$ and the retention flanges 306 are separated by a lip-to-lip distance $d_{ll}$ that is less than the wall-to-wall distance $d_{ww}$. A multicable clip width $w_{mc}$ (FIG. 4A) of the multicable clips 202 to which the cable raceway 206 is coupled may be less than or equal to the wall-to-wall distance $d_{ww}$. When the cable raceway 206 is coupled to a multicable clip 202, a spreading force may be applied to the sidewalls 304 to cause the sidewalls 304 to flex outward to temporarily increase the lip-to-lip distance $d_{ll}$ to greater than the multicable clip width $w_{mc}$. With the lip-to-lip distance $d_{ll}$ temporarily increased, the cable raceway 302 may be moved relative to the multicable clip 202 until the retention flanges 306 clear the multicable clip 202. After the retention flanges 306 clear the multicable clip 202, the spreading force may be removed from the sidewalls 304, allowing the sidewalls 304 to at least partially return to their unspread state. Insofar as the lip-to-lip distance $d_{ll}$ is less than the multicable clip width $w_{mc}$, the retention flanges 306 of the cable raceway 206 may engage the multicable clip 202 to secure the cable raceway 206 to the multicable clip 202.

Figure 4A:
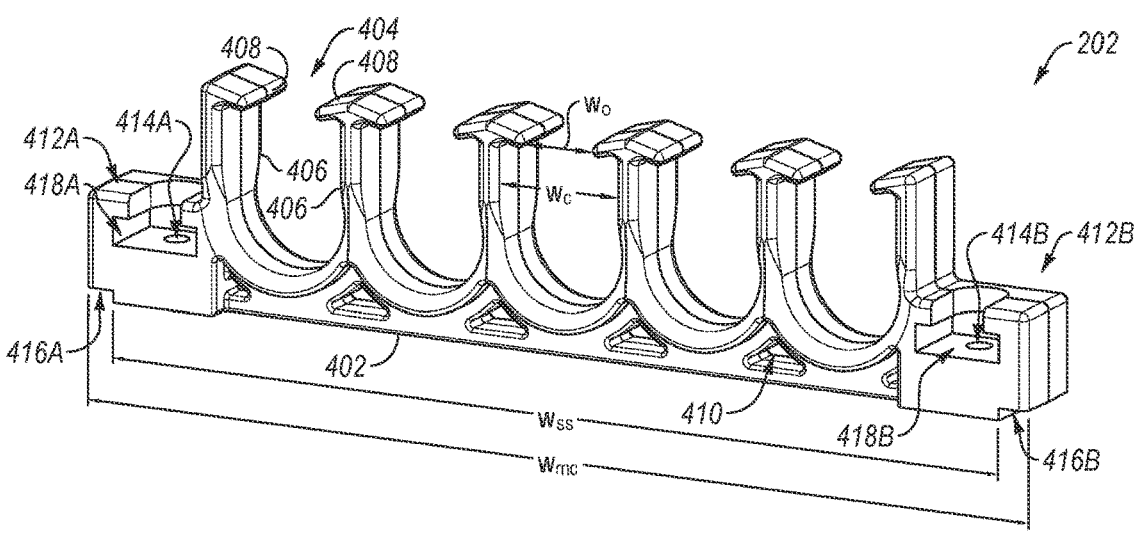
FIGS. 4A and 4B include perspective views of a multicable clip of the cable management system of FIGS. 2A-2C.
Figure 4B:
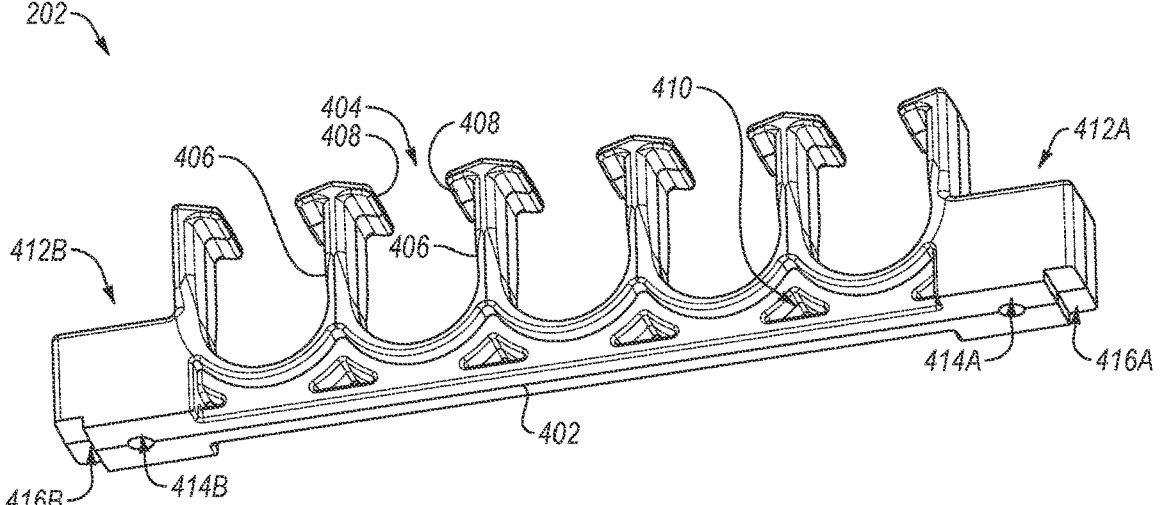

FIGS. 4A and 4B include perspective views of one of the multicable clips 202 of the system 200 of FIGS. 2A-2C, arranged in accordance with at least one embodiment described herein. More particularly, FIG. 4A includes a top front perspective view and FIG. 4B includes a bottom rear perspective view of the multicable clip 202. Each of the multicable clips 202 of FIGS. 2A-2C may be configured similarly or identically to the multicable clip 202 of FIGS. 4A and 4B. As illustrated in FIGS. 4A and 4B, the multicable clip 202 includes a base 402 with multiple cradles 404 extending from the base 402. Only one of the cradles 404 is labeled in each of FIGS. 4A and 4B for simplicity.

The multicable clip 202 may further include clip arms 406 extending from the base 402. The clip arms 406 may extend in a common direction from the base 402, e.g., orthogonally, with a first end or proximal end of each clip arm 406 at the base 402 and a second end or distal end of each clip arm 406 opposite the first end. Each of the cradles 404 is formed by the base 402 and a pair of adjacent clip arms 406. Only two clip arms 406 that are adjacent to each other are labeled in FIGS. 4A and 4B for simplicity. Each of the clip arms 406 except the two clip arms 406 at opposing ends of the multicable clip 202 forms a portion of two adjacent cradles 404. The two clip arms 406 at the opposing ends of the multicable clip 202 each forms a portion of a single cradle 404, e.g., of a corresponding one of the cradles 404 at the opposing ends of the multicable clip 202.

The multicable clip 202 may further include cradle retention fingers 408 extending from distal ends of the clip arms 406. Only two cradle retention fingers 408 are labeled in FIGS. 4A and 4B for simplicity. Each of the clip arms 406 except the two clip arms 406 at the opposing ends of the multicable clip 202 includes two cradle retention fingers 408 extending from its distal end. The two clip arms 406 at the opposing ends of the multicable clip 202 each includes a single cradle retention finger 408 extending from its distal end. According to the illustrated arrangement, each cradle 404 includes two cradle retention fingers 408 each extending at least partially toward the other cradle retention finger 408 and/or at least partially toward the opposing clip arm 406.

Each of the cradles 404 has a cradle width $w_c$ and an opening width $w_o$. Only one of the cradle widths $w_c$ and opening widths $w_o$ is labeled in FIG. 4A for simplicity. Other cradles 404 of the multicable clip 202 may have the same or different cradle widths $w_c$ and/or opening widths $w_o$. The cradle width $w_c$ is the distance between clip arms 406 of a given cradle 404. The opening width $w_o$ is the distance between cradle retention fingers 408 of the given cradle 404. In some embodiments, the cradle width $w_c$ may be greater than or equal to a cable outer diameter $d_o$ (FIG. 7B) of the cables 210 and the opening width $w_o$ may be less than cable outer diameter $d_o$.

The multicable clip 202 may be made of plastic or other suitable material. In some embodiments, the multicable clip 202 may include a resilient material capable of some elastic deformation or flex, e.g., during installation of the cables 210 into the cradles 404. In these and other embodiments, each of the clip arms 406 may be resiliently deformable. For example, each of the clip arms 406 may be configured to flex outward and/or resiliently deform in response to passage of a corresponding one of the cables 210 through a corresponding opening of a corresponding cradle 404. In more detail, as a cable 210 passes between cradle retention fingers 408 during installation into one of the cradles 404, the passage of the cable 210 forces the cradle retention fingers 408 of the cradle 404 apart since under normal conditions the opening width $w_o$ may be less than the cable outer diameter $d_o$. Since the cradle retention fingers 408 extend from distal ends of the clip arms 406, the clip arms 406 of the cradle 404 flex outward as the cradle retention fingers 408 are forced apart by passage of the cable 210. After the widest part of the cable 210 passes through the opening (e.g., after half of the cable 210 clears the cradle retention fingers 408), the clip arms 406 may gradually unflex as the cable 210 continues passing between the cradle retention fingers 408, the cradle retention fingers 408 thus returning inward until eventually the cable 210 is fully within the cradle 404. When the cable 210 is fully within the cradle 404, and assuming the cable outer diameter $d_o$ is less than the cradle width $w_c$, the clip arms 406 may be in an unflexed state with the cradle retention fingers 408 no longer forced apart.

In some embodiments, the cradle retention fingers 408 may be sloped or extend partially toward the base 402, in addition to extending toward each other and/or the opposing clip arm 406 of the same cradle 404. Sloping or angling the cradle retention fingers 408 toward the base 402 may facilitate passage of the cables 210 into the cradles 404 as the angle of the cradle retention fingers 408 may convert some cradle-directed force exerted by a cable 210 as it is being inserted into the cradle 404 to an outward-directed or spreading force on the cradle retention fingers 408 and clip arms 406 of the cradle 404. The angle of the cradle retention fingers 408 may also make it more difficult to remove cables 210 from the cradles 404 than to insert cables 210 into the cradles 404 as the angle of the cradle retention fingers 408 when cables 210 are being removed from cradles 404 may not convert (or may convert less of) exit-directed force to outward-directed or spreading force.

The multicable clip 202 may further include openings 410 defined in the base 202 and/or pedestals 412A, 412B (collectively "pedestals 412" or generically "pedestal 412") at opposite ends of the base 202. Only one opening 410 is labeled in each of FIGS. 4A and 4B for simplicity. The openings 410 may be positioned in the base 402 at the proximal ends of the clip arms 406, e.g., a different opening 410 formed in the base 402 at the proximal end of each clip arm 406. Alternatively or additionally, openings 410 may be positioned elsewhere in the base 402.

Each opening 410 may be configured to receive through the opening 410 an elongate fastener such as a zip tie to secure a cable 210 in a cradle 404. For example, and with a cable 210 in a cradle 404, a zip tie may be routed through one opening 410 at the first end of one clip arm 406 of the cradle 404, around the cable 210, through the other opening 410 at the first end of the other clip arm 406 of the cradle 404, and around the cable 210 again to where ends of the zip tie may be joined together.

The pedestals 412 may be formed at opposite ends of the base 402 and/or may be configured to couple the multicable clip 202 to one or more installation structures, such as the installation surface 214 of FIG. 2C. The installation structure may include an installation surface (floor, wall, ceiling, etc.), a riser (such as the risers 208), or other structure to which the multicable clip 202 may be coupled. Each pedestal 412 may define a through hole 414A, 414B (collectively "through holes 414" or generically "through hole 414") configured to receive a fastener. For example, a screw, bolt, or other fastener may be inserted through each through hole 414 to secure the multicable clip 202 to an installation surface (e.g., floor, wall, ceiling) at an installation site, a riser 208, or other installation structure.

Each pedestal 412 has a shoulder 416A, 416B (collectively "shoulders 416" or generically "shoulder 416") formed in the pedestal 412, the shoulders 416 configured to engage the cable raceway 206. More particularly, each shoulder 416 is configured to engage a corresponding retention flange 306 of the cable raceway 206. As illustrated in FIG. 4A, a multicable clip shoulder-to-shoulder width $w_{ss}$ of the multicable clip 202 is less than the multicable clip width $w_{mc}$ and may be less than or equal to the lip-to-lip distance $d_{ll}$ of the cable raceway 206. As previously described, the cable raceway 206 may be coupled to the multicable clip 202 by applying a spreading force to the sidewalls 304 to temporarily increase the lip-to-lip distance $d_{ll}$ while the cable raceway 206 is positioned with the retention flanges 306 aligned to the shoulders 416. When the spreading force is removed with the cable raceway 206 in this position, the sidewalls 304 and retention flanges 306 return inward until the retention flanges 306 are positioned in and engage the shoulders 416.

Each pedestal 412 may further define a riser recess 418A, 418B (collectively "riser recesses 418" or generically "riser recess 418") having an interior shape that is complementary to an exterior shape of a portion of a corresponding riser 208 configured to be received in the riser recess 418. The riser recesses 418 are described in additional detail with reference to FIG. 4C, which is a top front perspective view of the pedestal 412B, arranged in accordance with at least one embodiment described herein. The pedestal 412A and/or other pedestals herein may be the same as, similar to, or different than the pedestal 412B depicted in FIG. 4C.

Figure 4C:
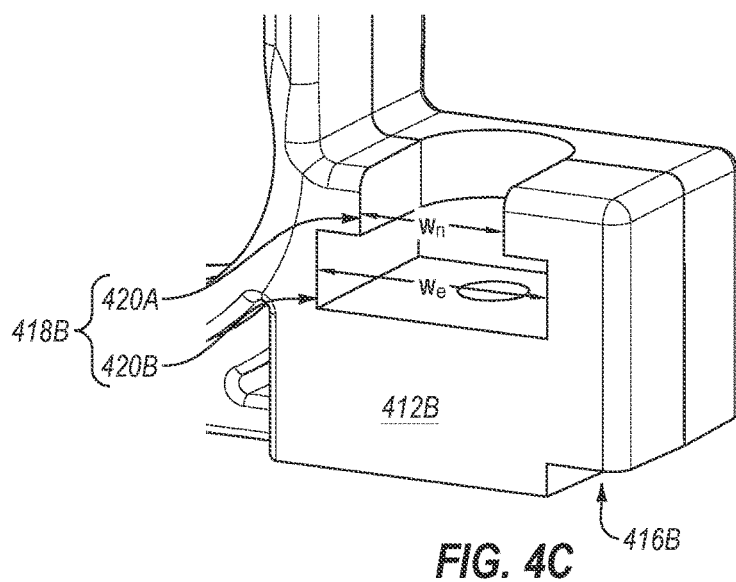
FIG. 4C is a top front perspective view of a pedestal of the multicable clip of FIGS. 4A and 4B.

As illustrated in FIG. 4C, the riser recess 418B may include a neck portion 420A and an enlarged portion 420B. The neck portion 420A may have, at least at its opening, a neck width $w_n$ while the enlarged portion 420B may have, at least at its opening, an enlarged width $w_e$ that is greater than the neck width $w_n$. An interior shape of the enlarged portion 420B may be complementary to an exterior shape of a base of a corresponding riser 208 such that the base of the riser 208 may be received in the enlarged portion 420B of the riser recess 418B. An interior shape of the neck portion 420A may be complementary to an exterior shape of a portion of a column of the riser 208 that is proximate to the base such that the portion of the column of the riser 208 that is proximate to the base of the riser may be received in the neck portion 420A of the riser recess 418B.

Figure 5A:
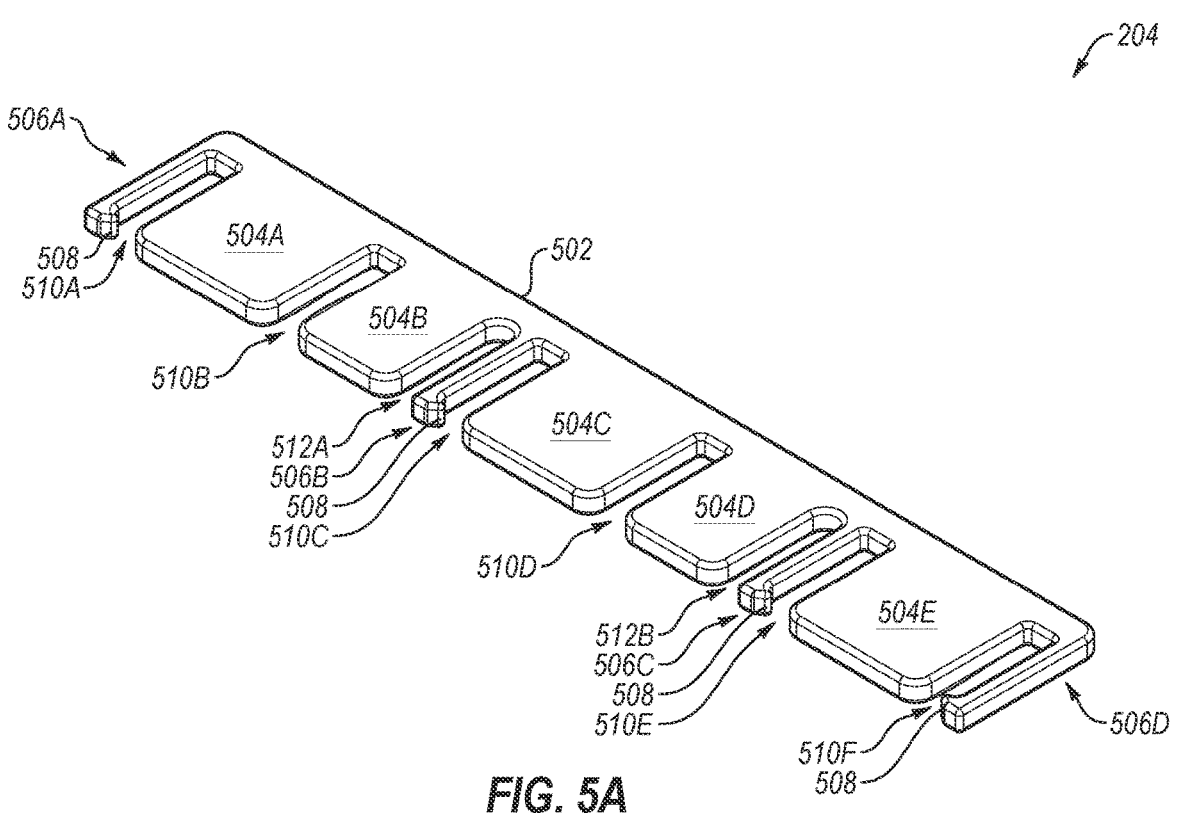
FIGS. 5A and 5B include perspective views of a retention plate of the cable management system of FIGS. 2A-2C.
Figure 5B:
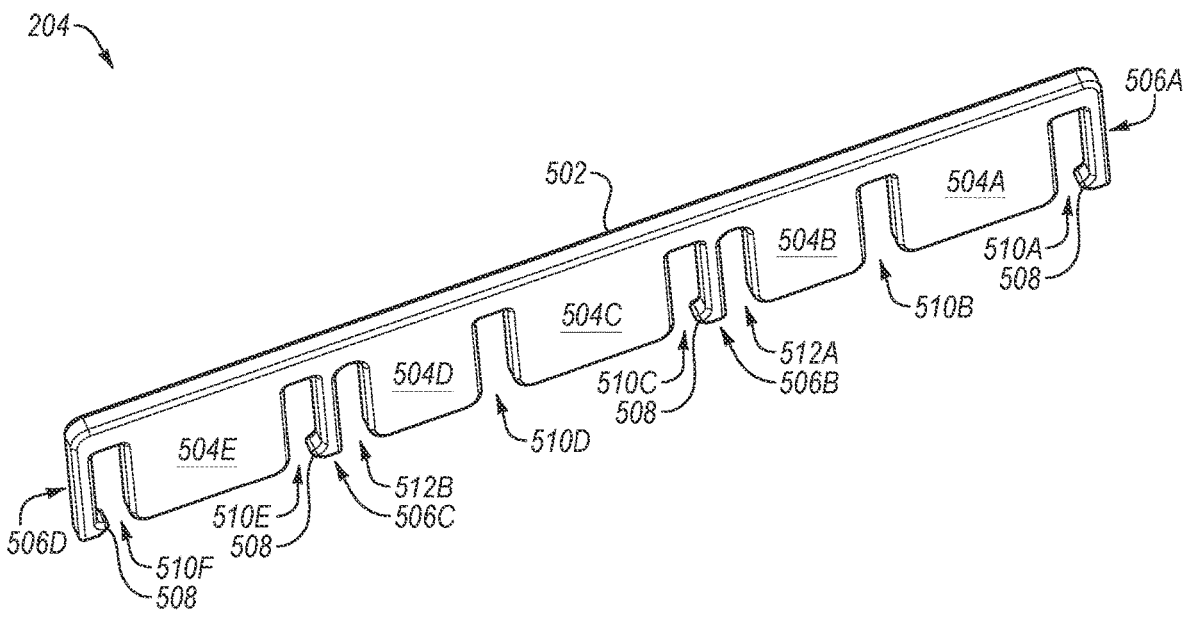

FIGS. 5A and 5B include perspective views of one of the retention plates 204 of the system 200 of FIGS. 2A-2C, arranged in accordance with at least one embodiment described herein. More particularly, FIG. 5A includes a top front perspective view and FIG. 5B includes a bottom rear perspective view of the retention plate 204. Each of the retention plates 204 of FIGS. 2A-2C may be configured similarly or identically to the retention plate 204 of FIGS. 5A and 5B. The retention plate 204 is configured to be coupled to a multicable clip, such as the multicable clip 202.

As illustrated in FIGS. 5A and 5B, the retention plate 204 includes a spine 502 with spacers 504A-504E (collectively "spacers 504" or generically "spacer 504") and plate retention fingers 506A-506D (collectively "plate retention fingers 506" or generically "plate retention finger 506") extending from the spine 502. The spacers 504 may be configured to block openings of the cradles 404 of the multicable clip 202 to retain cables 210 within the cradles 404. The plate retention fingers 506 may be configured to engage some or all of the clip arms 406 to secure the retention plate 204 to the multicable clip 202. In some embodiments, the plate retention fingers 506 include end protrusions 508 configured to engage clips arms 406 to couple the retention plate 204 to the multicable clip 202.

The retention plate 204 defines two or more arm voids 510A-510F (collectively "arm voids 510" or generically "arm void 510") and one or more flex voids 512A, 512B (collectively "flex voids 512" or generically "flex void 512") between the spacers 504 and plate retention fingers 506. Each of the plate retention fingers 506 is separated from each corresponding adjacent spacer 504 by a corresponding void 510 or 512. For example, the plate retention finger 506B is separated from the spacer 504B by the flex void 512A and is separated from the spacer 504C by the arm void 510C.

Similarly, the plate retention finger 506A is separated from the spacer 504A by the arm void 510A.

Each of the arm voids 510 is configured to receive a corresponding clip arm 406 of the multicable clip 202 when the retention plate 204 is coupled to the multicable clip 202. Each of the clip arms 406 may have a width that is less than or equal to a width of the arm void 510 and greater than a width of an opening of the arm void 510 at the end protrusion 508.

Each of the flex voids 512 is configured to accommodate flexing or deformation of a corresponding one of the plate retention fingers 506 when the retention plate 204 is coupled to the multicable clip 202. In more detail, the retention plate 204 may be made of plastic or other suitable material and/or may include a resilient material capable of some elastic deformation or flex, e.g., during coupling of the retention plate 204 to the multicable clip 202. In these and other embodiments, each of the plate retention fingers 506 may be resiliently deformable. For example, each of the plate retention fingers 506 may be configured to flex backward (i.e., away from the side of the plate retention finger 506 with the end protrusion 508) and/or resiliently deform in response to passage of a corresponding one of the clip arms 406 through a corresponding opening of a corresponding arm void 510. The plate retention fingers 506B and 506C may be specifically configured to flex into the corresponding flex void 512A or 512B, the flex voids 512A and 512B being formed to accommodate flexing of the plate retention fingers 506B and 506C. As a clip arm 406 passes between a front of a plate retention finger 506 (i.e., the side of the plate retention finger 506 with the end protrusion 508) and an adjacent spacer 504 during coupling of the retention plate 204 to the multicable clip 202, the passage of the clip arm 406 forces the plate retention finger 506 to flex backward since under normal conditions the width of the opening of the arm void 510 is less than the width of the clip arm 406. Since the end protrusions 508 extend from ends of the plate retention fingers 506, the plate retention fingers 506 flex backward as the end protrusions 508 are forced backward by the clip arms 406. After the clip arms 406 pass through the openings of the arm voids 510 and all the way into the arm voids 510, the plate retention fingers 506 may be at an unflexed state or reduced flex state.

In some embodiments, the end protrusions 508 may be sloped or angled at their leading surface, where the leading surface of an end protrusion 508 is the surface furthest from the spine 502 of the retention plate 204. Sloping or angling leading surfaces of the end protrusions 508 may facilitate passage of the clip arms 506 into the arm voids 510 as the angle of the leading surfaces of the end protrusions may convert some spine-directed force exerted by a clip arm 406 as it is being inserted into the arm void 510 to backward-directed force on the end protrusion 508 and plate retention finger 506. Alternatively or additionally, the trailing surface of each end protrusion 508 may be sloped or angled positively or negatively to make removal of the retention plate 204 from the multicable clip 202 easier or harder, where the trailing surface of an end protrusion 508 is the surface closest to the spine 502 of the retention plate 204.

Figure 6A:
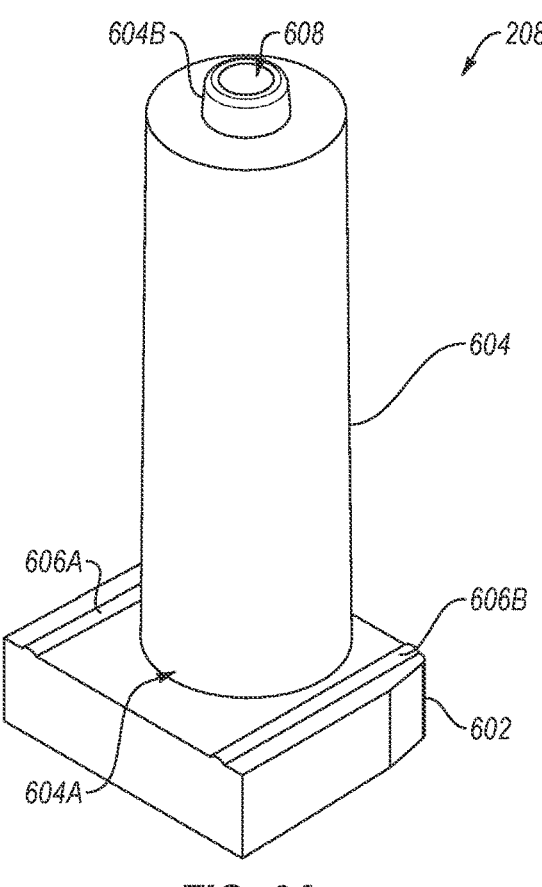
FIGS. 6A and 6B include views of a riser of the cable management system of FIGS. 2A-2C.
Figure 6B:
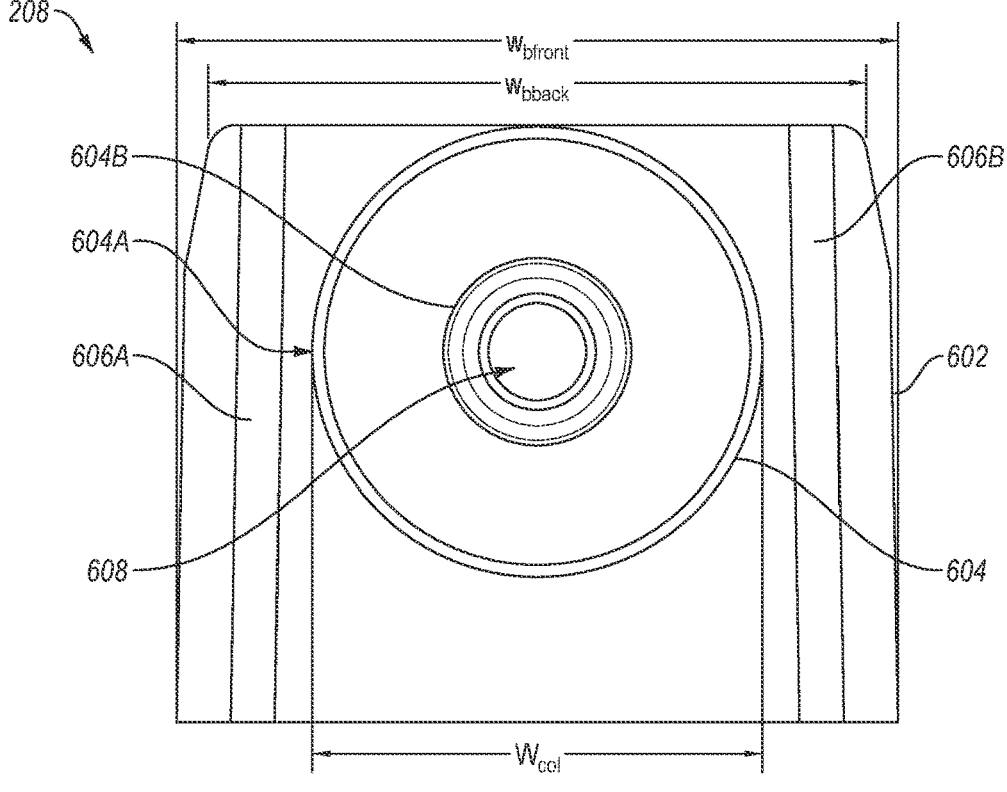

FIGS. 6A and 6B include views of one of the risers 208 of the system 200 of FIGS. 2A-2C, arranged in accordance with at least one embodiment described herein. More particularly, FIG. 6A includes a top front perspective view and FIG. 6B includes an overhead view of the riser 208. Each of the risers 208 of FIGS. 2A-2C may be configured similarly or identically to the riser 208 of FIGS. 6A and 6B. The riser 208 is configured to couple one multicable clip 202 to another multicable clip 202. Alternatively or additionally, the riser 208 is configured to align cradles 404 of one of the multicable clips 202 to cradles 404 of the other multicable clip 202 and/or to space the multicable clips 202 apart from each other.

The riser 208 includes a base 602 and a column 604 that extends from the base 602. A base multicable clip 202 may be coupled to the riser 208 at the base 602 while an elevated multicable clip 202 may be coupled to the riser 208 at an end of the column 604 opposite the base 602. Alternatively or additionally, in a stacked retention assembly 212 that includes two or more elevated multicable clips 202, the elevated multicable clip 202 that is closest to the base multicable clip 202 may be coupled to the riser 208 at the base 602 while the elevated multicable clip 202 that is furthest from the base multicable clip 202 may be coupled to the riser 208 at the end of the column 604 opposite the base 602. For simplicity in the discussion herein, the riser 208 is described as coupling a base multicable clip 202 to an elevated multicable clip 202. However, the discussion applies equally to the coupling by the riser 208 of one elevated multicable clip 202 to another elevated multicable clip 202.

The base 602 is configured to be received within the enlarged portion 420B of the riser recess 418 of the base multicable clip 202 and/or may have an exterior shape that is complementary to an interior shape of the riser recess 418. In some embodiments, the base 602 has a wedge or taper shape, being wider at the front than at the back, where the front is the side of the riser 208 facing outward when the base 602 is positioned within the enlarged portion 420B of the riser recess 418. For example, as illustrated in FIG. 6B, the base 602 may have a front width $w_{bfront}$ that is greater than its back width $w_{bback}$. At least the back width $w_{back}$ of the base 602 may be less than or equal to the enlarged width $w_e$ of the enlarged portion 420B of the riser recess 418. In some embodiments, the front width $w_{bfront}$ of the base 602 may be equal to or slightly greater than the enlarged width $w_e$ of the enlarged portion 420B of the riser recess 418. In these and other embodiments, the narrower back width $w_{bback}$ of the base 602 may facilitate easy initial insertion of the base 602 into the enlarged portion 420B of the riser recess 418 while the equal or slightly greater front width $w_{bfront}$ may provide tactile feedback to indicate when the base 602 is fully inserted into the enlarged portion 420B and/or may frictionally secure the base 602 within the enlarged portion 420B when the base 602 is fully inserted.

Alternatively or additionally, the base 602 may include one or more retention ridges 606A, 606B (collectively "retention ridges 606" or generically "retention ridge 606") extending from one or more surfaces of the base 602. The retention ridges 606 are illustrated in FIGS. 6A and 6B as extending from a surface of the base 602 proximate to the column 604. In other embodiments, one or more retention ridges 606 may extend from one or more other surfaces of the base 602. In some embodiments, a height of the base through one of the retention ridges 606 may be equal to or slightly greater than a height of the enlarged portion 420B of the riser recess 418. When the base 602 is inserted into the riser recess 418, the retention ridges 606 may increase friction between the base 402 and a corresponding surface of the riser recess 418 to frictionally secure the base 602 within the enlarged portion 420B.

The column 604 includes a portion 604A proximate to the base 602, the portion 604A being complementary to the neck portion 420A of the riser recess 418. The portion 604A has a column width $w_{col}$ that is less than or equal to the neck width w n of the neck portion 420A of the riser recess 418. As such, the portion 604A of the column 604 may be received in the neck portion 420A of the riser recess 418 when the riser 208 is coupled to the pedestal 412 of the base multicable clip 202. The neck portion 420A and more generally the overall shapes of the riser recess 418, the base 602, and the portion 604A may prevent the riser 208 from moving relative to the base multicable clip 202 in any direction other than opposite the direction in which the base 602 and the portion 604A of the column 604 are inserted into the riser recess 418.

The column 604 additionally includes a tip 604B configured to be received within the through hole 414 of the pedestal 412 of the elevated multicable clip 202. The tip 604B may have a width less than or equal to an inner diameter of the through hole 414 to be received in the through hole 414. Alternatively or additionally, the tip 604B may define a blind hole 608 and a fastener such as a screw, bolt, or the like, may be inserted through the through hole 414 of the elevated multicable clip 202 and threaded into the blind hole 608 to couple the elevated multicable clip 202 to the riser 208.

Figure 7A:
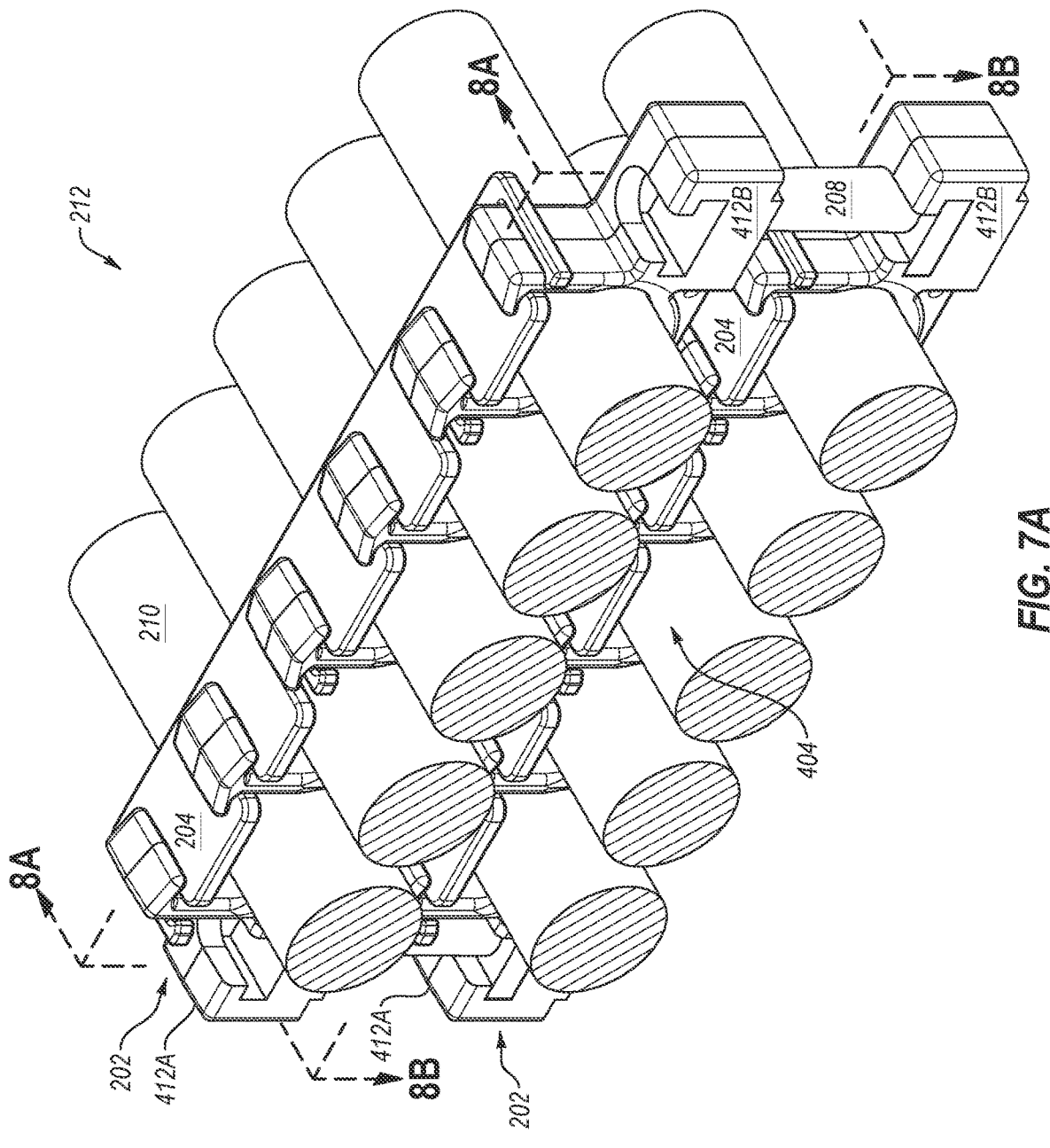
FIG. 7A is a top front perspective view of stacked retention assembly of the cable management system of FIGS. 2A-2C.

FIG. 7A is a top front perspective view of one of the stacked retention assemblies 212 of FIGS. 2A-2C, arranged in accordance with at least one embodiment described herein. Each of the stacked retention assemblies 212 of FIGS. 2A-2C may be configured similarly or identically to the stacked retention assembly 212 of FIG. 7A. FIG. 7A additionally illustrates cables 210 routed through cradles 404 of the multicable clips 202.

Figure 7B:
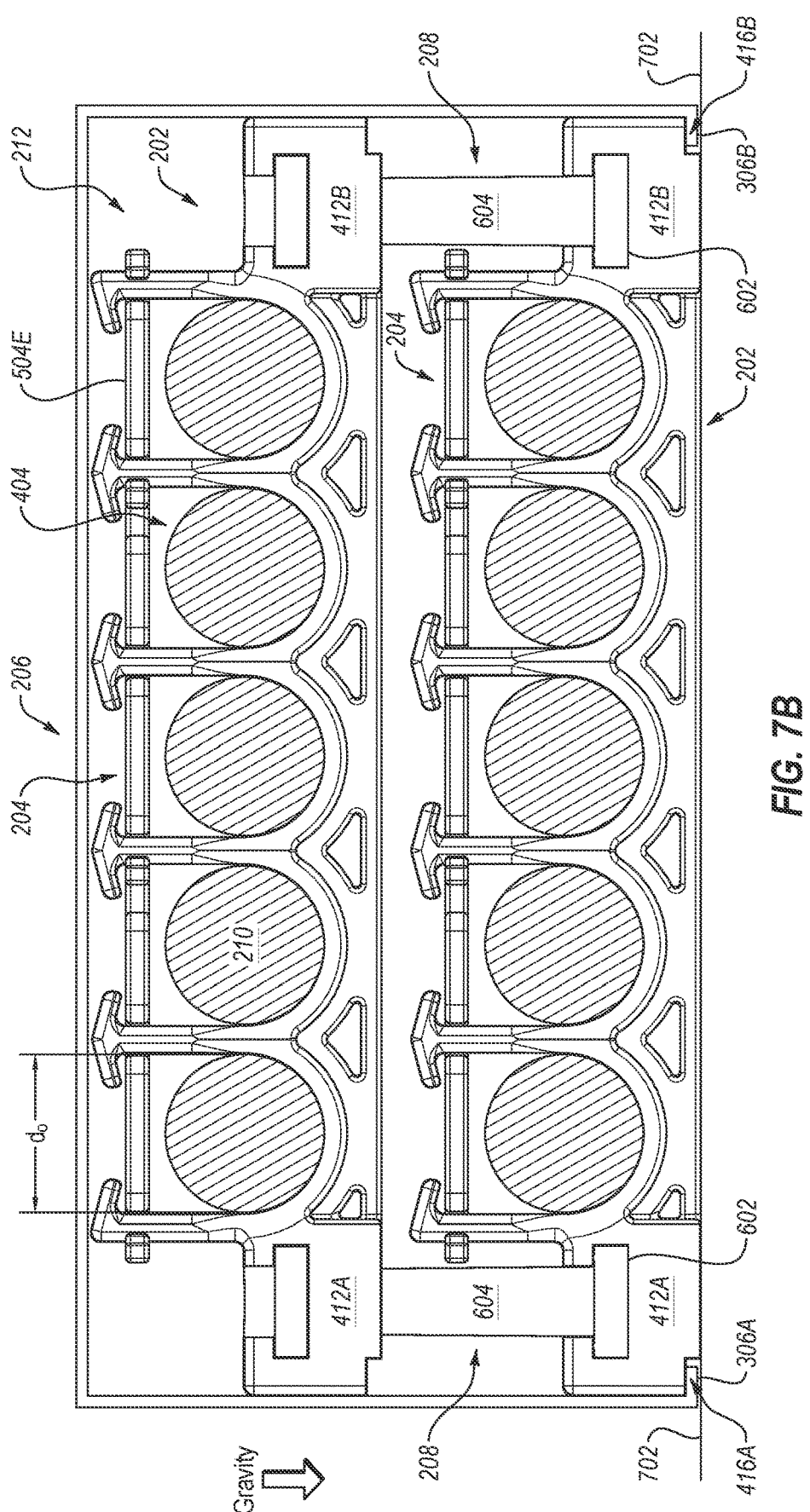
FIG. 7B is a front view of the stacked retention assembly of FIG. 7A with a base multicable clip positioned beneath an elevated multicable clip relative to gravity.

FIG. 7B is a front view of the stacked retention assembly 212 of FIG. 7A with the base multicable clip 202 positioned beneath the elevated multicable clip 202 relative to gravity, arranged in accordance with at least one embodiment described herein. The stacked retention assembly 212 is shown coupled, e.g., through pedestals 412 of the base multicable clip 202, to an installation structure 702 such as a floor of an installation site. As in other FIGS. herein, reference labels are applied to some components, but not necessarily all components, for simplicity.

FIG. 7B additionally illustrates the cables 210 routed through the cradles 404 of the multicable clips 202. As illustrated in FIG. 7B, the force of gravity in FIG. 7B pulls the cables 210 toward the installation structure 702 within the cradles 404.

Figure 7C:
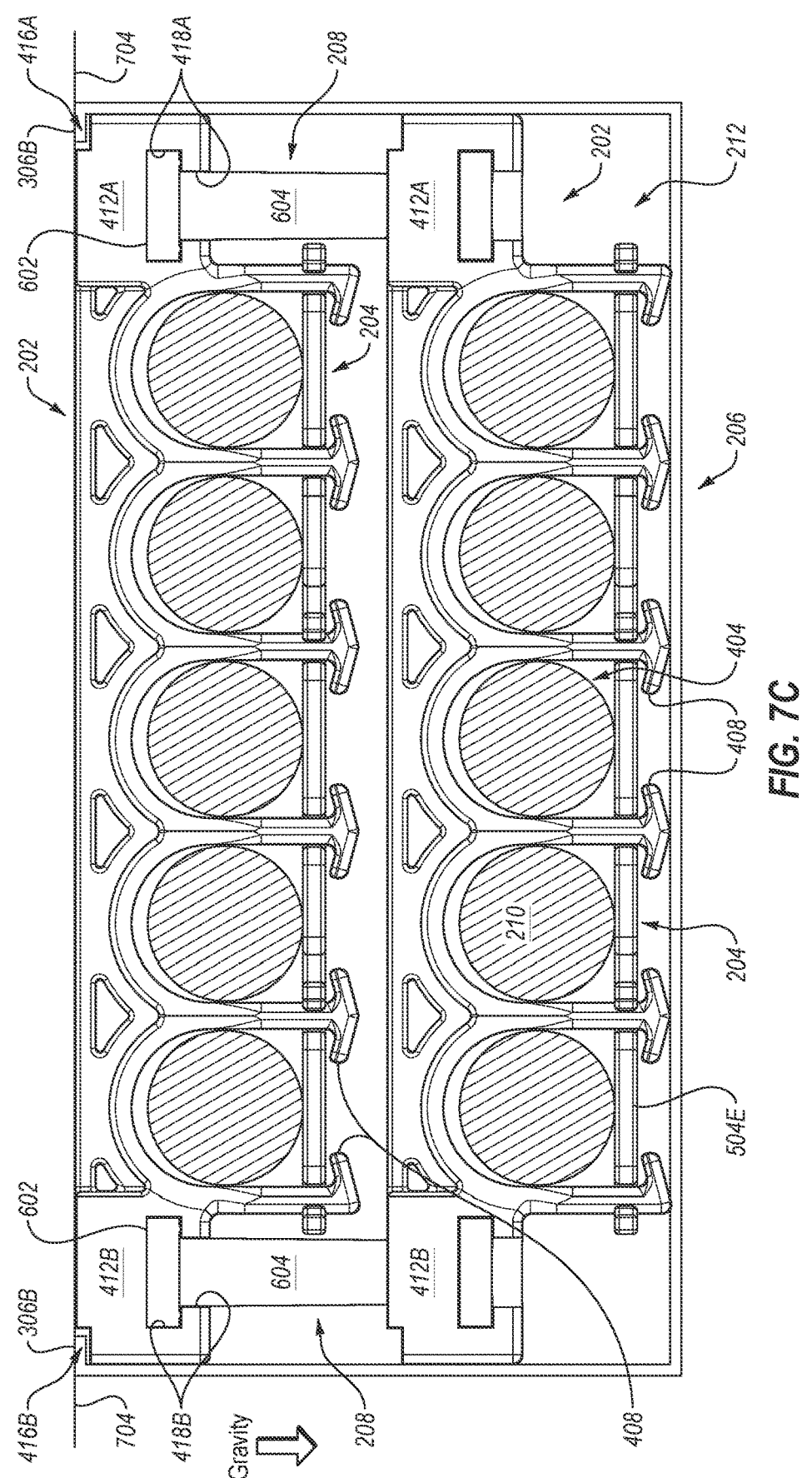
FIG. 7C is a front view of the stacked retention assembly of FIG. 7A with the base multicable clip positioned above the elevated multicable clip relative to gravity.

FIG. 7C is a front view of the stacked retention assembly 212 of FIG. 7A with the base multicable clip 202 positioned above the elevated multicable clip 202 relative to gravity, arranged in accordance with at least one embodiment described herein. The stacked retention assembly 212 is shown coupled, e.g., through pedestals 212 of the base multicable clip 202, to an installation structure 704 such as a ceiling of an installation site. As in other FIGS. herein, reference labels are applied to some components, but not necessarily all components, for simplicity.

FIG. 7C additionally illustrates the cables 210 routed through the cradles 404 of the multicable clips 202. As illustrated in FIG. 7C, the force of gravity in FIG. 7C pulls the cables 210 within the cradles 404 away from the installation structure 704. The cradle retention fingers 408 prevent retention plates 204 from being disconnected from the multicable clips 202 by gravity and the retention plates 204 together with the multicable clips 202 thereby prevent the cables 210 from being pulled out of the cradles 404 by gravity. It can additionally be seen from FIG. 7C that the complementary shapes of the riser recesses 418 (of the base multicable clip 202) and the bases 602 and columns 608 of the risers 208 with the neck width $w_n$ being narrower than the enlarged width $w_e$ prevents the risers 208 from being pulled out of the pedestals 412 of the base multicable clip 202 by gravity, even without using fasteners (such as screws or bolts) to secure the pedestals 412 of the base multicable clip 202 to the risers 208. Optionally, fasteners may additionally be used to secure the pedestals 412 of the base multicable clip 202 to the risers 208.

FIGS. 7B and 7C further illustrate the cable raceway 206 coupled to pedestals 412 of the base multicable clip 202. It can be seen in FIGS. 7B and 7C that the retention flanges 306 of the cable raceway 206 engage the shoulders 416 of the base multicable clip 202 to secure the cable raceway 206 to the base multicable clip 202 and more generally to the stacked retention assembly 212. The configuration of the cable raceway 206 and the base multicable clip 202, specifically the retention flanges 306 of the cable raceway 206 and the shoulders 416 of the base multicable clip 202, may secure the cable raceway to the base multicable clip 202 in any orientation of the cable raceway 206 and the base multicable clip 202 relative to gravity. For example, as illustrated in FIG. 7C, seating the retention flanges 306 in the shoulders 416 may prevent gravity from pulling the cable raceway 206 downward away from the stacked retention assembly 212.

Figure 8A:
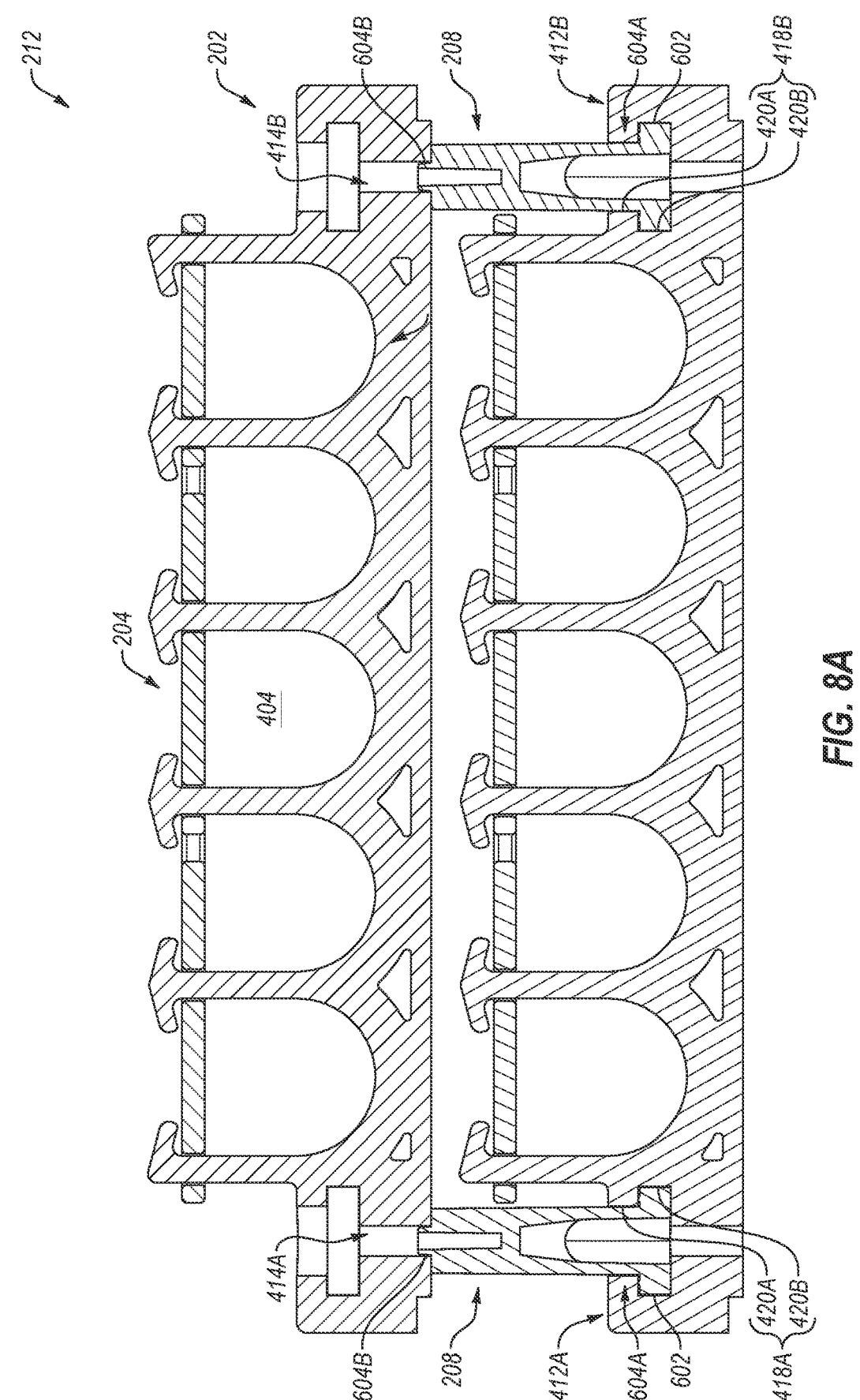
FIGS. 8A-8D include cross-sectional views of the retention assembly of FIGS. 7A-7C.
Figures 8B, 8C, 8D:
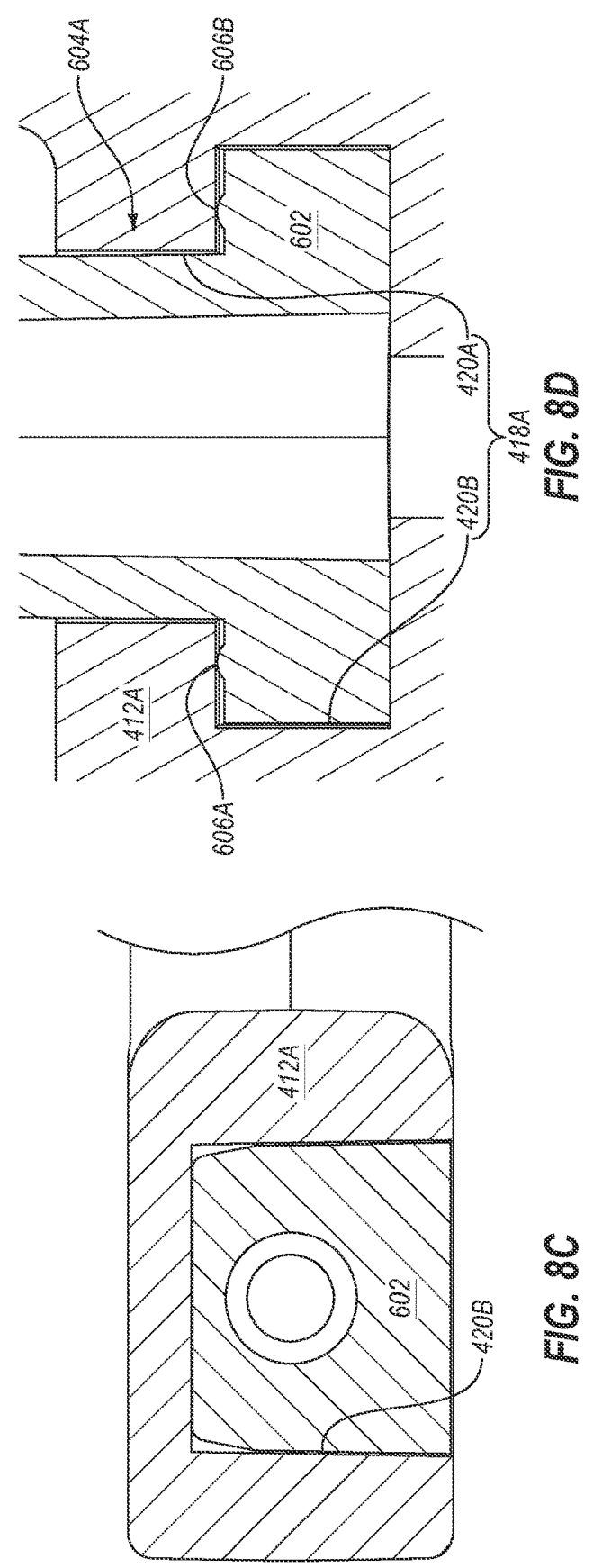

FIGS. 8A-8D include cross-sectional views of the retention assembly 212 of FIGS. 7A-7C, arranged in accordance with at least one embodiment described herein. In particular, FIG. 8A is a front cross-sectional view of the retention assembly 212 at cutting plane 8A-8A in FIG. 7A, FIG. 8B is an overhead cross-sectional view of the retention assembly 212 at cutting plane 8B-8B in FIG. 7A, FIG. 8C is an overhead cross-sectional view (in the same direction as FIG. 8B) through one of the pedestals 412 and bases 602 of the retention assembly 212, and FIG. 8D is a front cross-sectional view (in the same direction as FIG. 8A) through one of the pedestals 412 and bases 602 of the stacked retention assembly 212. As in other FIGS. herein, reference labels are applied to some components, but not necessarily all components, for simplicity.

FIG. 8A illustrates how the risers 208 mate with the pedestals 208 of the multicable clips 202 in the stacked retention assembly 212. For example, the tip 604B of each riser 208 may be received within the corresponding through hole 414 of the corresponding pedestal 412 of the elevated multicable clip 202. In addition, the base 602 and the portion 604A of each riser 208 may be received in the riser recess 418 of the base multicable clip 202.

FIG. 8B illustrates how the retention plate 204 mates with the multicable clip 202. As illustrated, each of the clip arms 406 is received within a corresponding one of the arm voids 510. For example, the two clip arms 406 closest to the pedestal 412A are received within the arm voids 510A, 510B. In addition, when the retention plate 204 and the multicable clip 202 are coupled together, the end protrusions 508 at the ends of the plate retention fingers 506 are positioned behind (i.e., on the opposite side of the clip arms 406 from the spine 502) the clip arms 406 to secure the retention plate 204 to the multicable clip 202. When removing the retention plate 204, a removal force on the retention plate 204 (up in FIG. 8B) forces the plate retention fingers 506 to flex backward sufficiently for the end protrusions 508 to clear the clip arms 406.

FIG. 8C illustrates the base 602 of the riser 208 received in the enlarged portion 420B of the riser recess 418 of the pedestal 412A. The wedge or taper shape of the base 602 may simplify initial alignment and insertion of the base 602 into the enlarged portion 420 and/or may increase friction as the base 602 is fully inserted into the enlarged portion 420B to frictionally secure the base 602 in the pedestal 412A.

FIG. 8D illustrates the base 602 and portion 604A of the riser 208 received in the riser recess 418 of the pedestal 412A. The retention ridges 606 may increase friction as the base 602 and portion 604A of the riser 208 are inserted into the riser recess 418 to frictionally secure the base 602 in the pedestal 412A.

Figure 9:
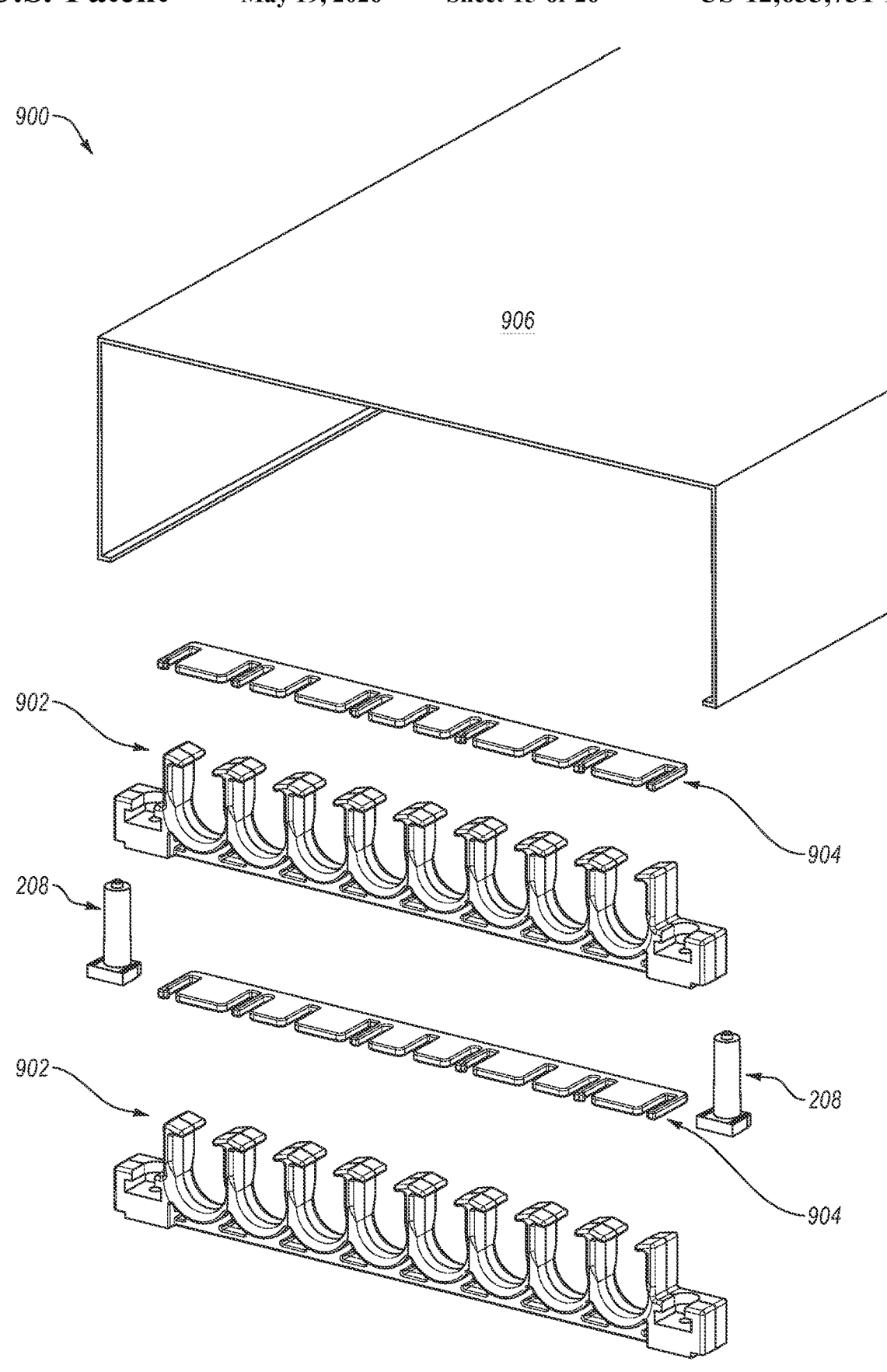
FIG. 9 illustrates another example cable management system that may be included in the EV charger system of FIG. 1A and/or the PV system of FIG. 1B.

FIG. 9 illustrates another example cable management system 900 (hereinafter "system 900") that may be included in the EV charger system 100 of FIG. 1A and/or the PV system 150 of FIG. 1B, arranged in accordance with at least one embodiment described herein. The system 900 may include, be included in, or correspond to one or more of the cable management systems 104 of FIG. 1. FIG. 9 includes an exploded top front perspective view of the system 900. As illustrated, the system 900 may include one or more multi-cable clips 902, one or more retention plates 904, a cable raceway 906, and/or one or more risers 208. Electrical cables (such as the cables 210) are omitted from FIG. 9 for clarity.

Each multicable clip 902 is configured to receive and secure multiple cables. In particular, each of the multicable clips 902 may be configured to receive and secure eight cables. The retention plates 904 couple to the multicable clips 902 to retain the cables in the multicable clip after placement therein. Two or more multicable clips 902 may be stacked together through the risers 208. The risers 208 couple the multicable clips 902 together (optionally with one or more threaded fasteners or other fasteners).

The multicable clips 902, the retention plates 904, and the cable raceway 906 are similar to the multicable clips 202, the retention plates 204, and the cable raceway 206 herein except that the multicable clips 902, the retention plates 904, and the cable raceway 906 are configured to receive and secure eight cables rather than five cables. As such, each of the multicable clips 902 includes eight cradles and each of the retention plates 904 includes eight spacers with the cable raceway 906 widened compared to the cable raceway 206 to accommodate the wider multicable clips 902 and retention plates 904 (relative to the multicable clips 202 and retention plates 904). All of the disclosure herein regarding the multicable clips 202, the retention plates 204, and the cable raceway 206 may similarly apply to the multicable clips 902, the retention plates 904, and the cable raceway 906 of FIG. 9.

Figure 10A:
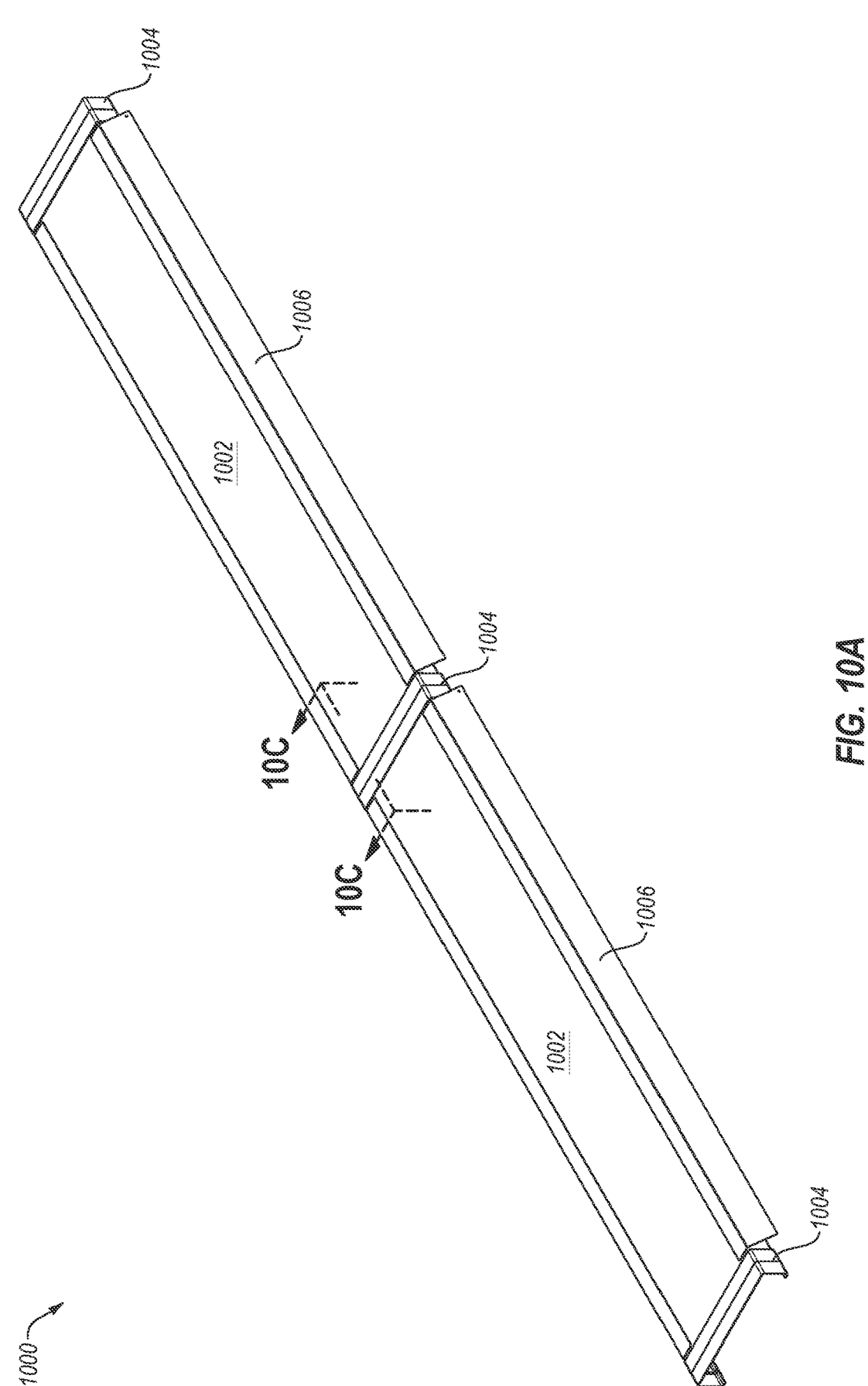
FIGS. 10A-10C illustrates an example cable raceway assembly that may be included in the EV charger system of FIG. 1A and/or the PV system of FIG. 1B.
Figure 10B:
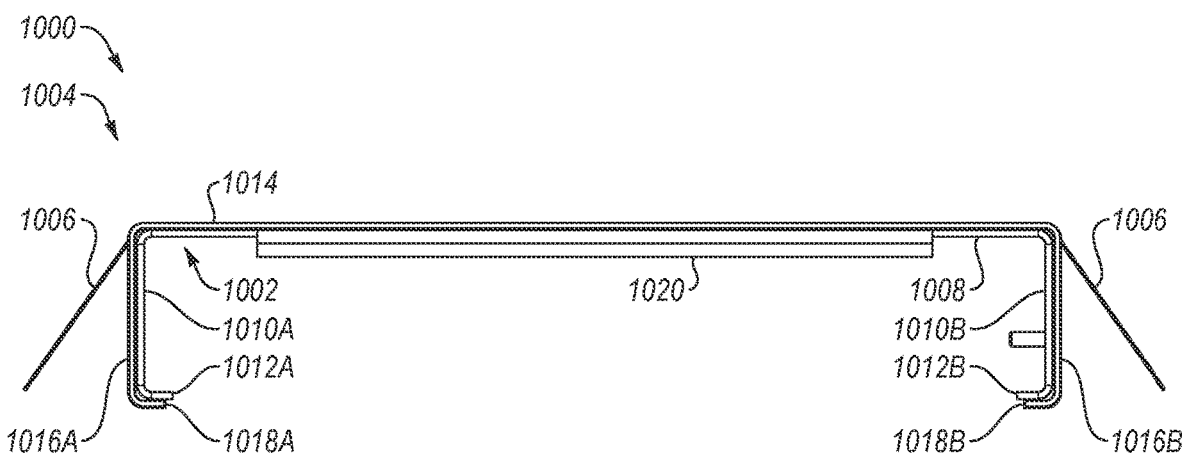
Figure 10C:
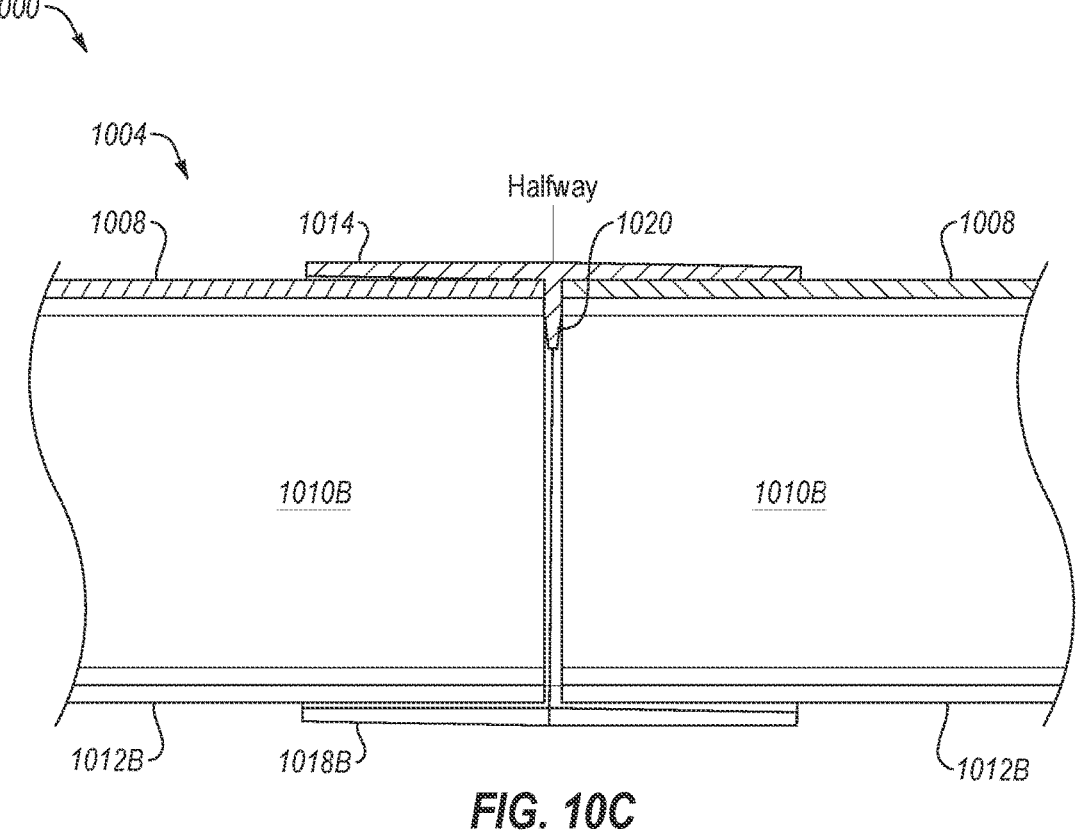

FIGS. 10A-10C illustrates an example cable raceway assembly 1000 that may be included in the EV charger system 100 of FIG. 1A and/or the PV system 150 of FIG. 1B, arranged in accordance with at least one embodiment described herein. Alternatively or additionally, the cable raceway assembly 1000 may be included in any of the cable management systems described herein, such as the system 200. In some embodiments, the cable raceway assembly 1000 may include, be included in, or correspond to one or more cable raceways described herein, such as the cable raceway 206. FIG. 10A is a perspective view of the cable raceway assembly 1000. FIG. 10B is a front view of the cable raceway assembly 1000. FIG. 10C is a cross-sectional view of a portion of the cable raceway assembly 1000 at the cutting plane 10C-10C in FIG. 10A.

In the illustrated embodiment, each cable raceway assembly 1000 includes cable raceways 1002, raceway joints 1004, and visibility clips 1006. Each of the cable raceways 1002 may include, be included in, or correspond to other cable raceways herein, such as the cable raceway 206. For example, each cable raceway 1002 may include a base wall 1008 and first and second sidewalls 1010A, 1010B (hereinafter collectively "sidewalls 1010" or generically "sidewall 1010") extending from the base wall 1008, in the same or similar manner as the cable raceway 206. Alternatively or additionally, each cable raceway 1002 further includes first and second retention flanges 1012A, 1012B (hereinafter collectively "retention flanges 1012" or generically "retention flange 1012"). The retention flanges 1012 extend from the sidewalls 1010 inward and/or toward each other. Alternatively or additionally, the retention flanges 1012 may extend at least partially toward the base wall 1008 and/or in other directions. The cable raceways 1002 and their various components (e.g., base wall 1008, sidewalls 1010, retention flanges 1012) may function in the same or similar manner as the corresponding components of the cable raceway 206. Accordingly, the disclosure herein relevant to the cable raceway 206 may similarly apply to the cable raceways 1002.

The raceway joints 1004 are configured to join, bridge, couple, or otherwise transition between two cable raceways 1002 positioned end-to-end and/or to terminate a cable raceway 1002. As illustrated, each raceway joint 1004 may include a base wall 1014 and first and second joint sidewalls 1016A, 1016B (hereinafter collectively "joint sidewalls 1016" or generically "joint sidewall 1016") extending from the base wall 1014. Alternatively or additionally, each raceway joint 1004 further includes first and second joint retention flanges 1018A, 1018B (hereinafter collectively "joint retention flanges 1018" or generically "joint retention flange 1018") and/or raceway separator 1020. The joint retention flanges 1018 extend from the joint sidewalls 1016 inward and/or toward each other. Alternatively or additionally, the joint retention flanges 1018 may extend at least partially toward the base wall 1014 and/or in other directions.

At least some dimensions of the raceway joints 1004 may be slightly larger than those of the cable raceways 1002. For example, as illustrated in FIG. 10B, a width (horizontal dimension in FIG. 10B) and height (vertical dimension in FIG. 10B) of the raceway joint 1004 may be slightly larger than the width and height of the cable raceway 1002 so that an end of the cable raceway 1002 may be received within and surrounded by the raceway joint 1004. As illustrated in FIG. the raceway separator 1020 may act as a stop to prevent either cable raceway 1002 from being inserted into the raceway joint 1004 beyond a halfway point of the raceway joint 1004. The raceway joint 1004 is discussed in more detail below in relation to FIGS. 15A-15C.

Each visibility clip 1006 may be coupled to one or more cable raceways 1002 and/or raceway joints 1004. Each visibility clip 1006 may be configured to increase a visibility of the cable raceways 1002, the cable raceway assembly 1000, a cable management system, or the like. In these and other embodiments, each visibility clip 1006 may include a first planar flange coupled to, extending from, and/or integrally formed with a second planar flange. The first planar flange may be coupled to a corresponding one of the cable raceways 1002 and/or raceway joints 1004 while the second planar flange may have a surface treatment, finish, color, effect, or other property to increase a visibility of the cable raceways 1002 (e.g., by virtue of increasing a visibility of the visibility clip 1006 coupled to the cable raceway 1002). By increasing the visibility of the cable raceways 1002, pedestrians may be less likely to trip over the cable raceways 1002 or cable raceway assembly 1000 and/or vehicle drivers may be more likely to slow down before driving over the cable raceways 1002 or cable raceway assembly 1000. In some embodiments, each visibility clip 1006 includes a surface that faces a direction from which passersby are expected to approach. In some embodiments, each visibility clip 1006 includes a surface that exhibits a retroreflective effect. In some embodiments, each visibility clip 1006 includes a surface having a neon yellow color, a neon green color, a neon orange color, a neon red color, or other color that is likely to visually attract the attention of pedestrians, vehicle drivers, and/or other individuals approaching and/or passing over the cable raceways 1002 or cable raceway assembly 1000.

Figure 11A:
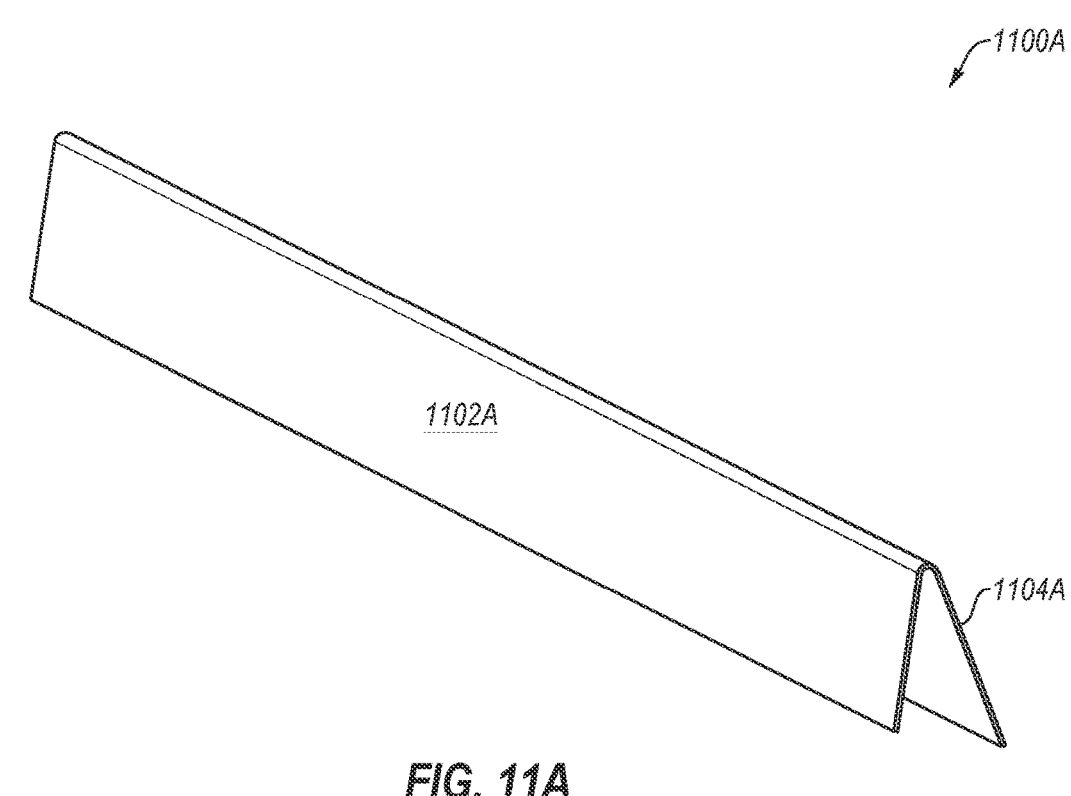
FIGS. 11A-11B illustrate example visibility clips that may be included in the cable raceway assembly of FIGS. 10A-10C.
Figure 11B:
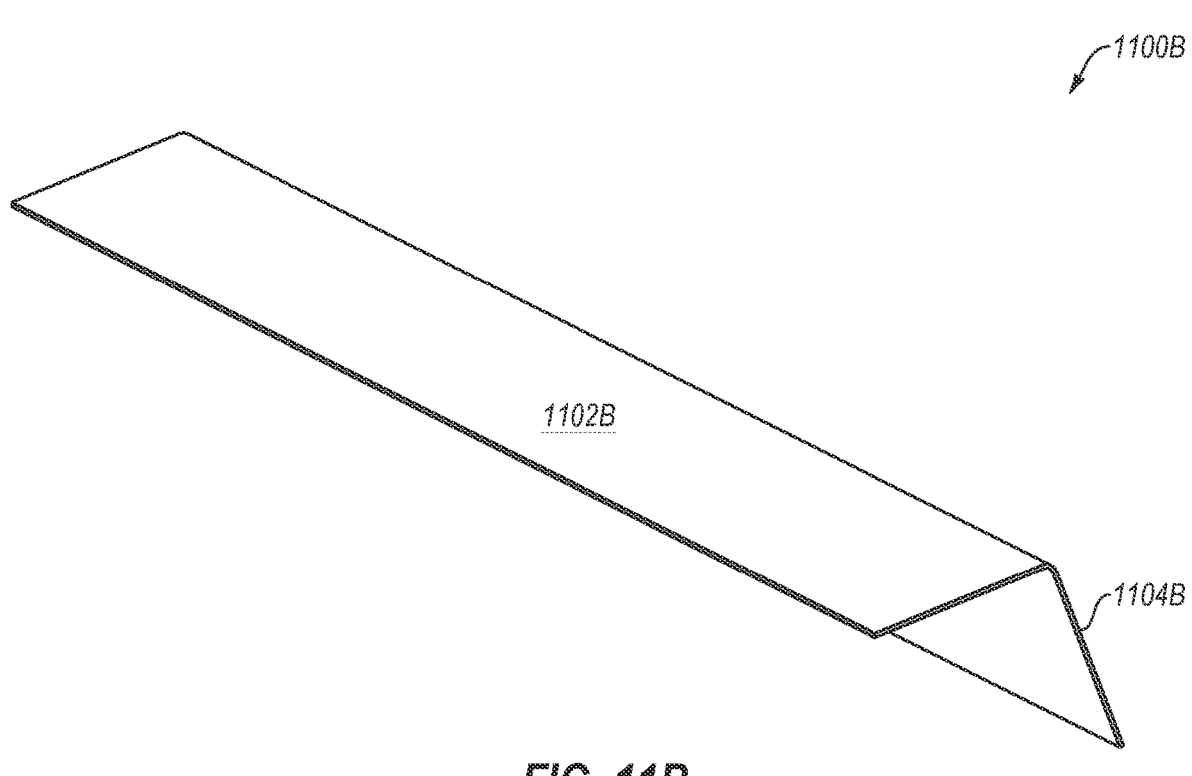

FIGS. 11A-11B illustrate example visibility clips 1100A, 1100B (hereinafter collectively "visibility clips 1100") that may be included in the cable raceway assembly 1000 of FIGS. 10A-10C or other systems or assemblies herein, arranged in accordance with at least one embodiment described herein. Each of the visibility clips 1100 includes a first planar flange 1102A, 1102B (hereinafter collectively "first planar flange 1102") and a second planar flange 1104A, 1104B (hereinafter collectively "second planar flange 1104"). The visibility clip 1100A includes the same configuration as the visibility clips 1006 of FIGS. 10A-10C.

In each of FIG. 11A and FIG. 11B, the first planar flange 1102 may be coupled to a corresponding one of the cable raceways 1002 and/or raceway joints 1004. For example, with combined reference to FIGS. 10A-11A, the first planar flange 1102A may be coupled to a corresponding sidewall 1010 of a corresponding cable raceway 1002. As another example, and with combined reference to FIGS. 10A-10C and 11B, the first planar flange 1102B may be coupled to the base wall 1008 of a corresponding cable raceway 1002. The first planar flanges 1102 of the visibility clips 1100 may be coupled to the cable raceways in any suitable manner, such as with an adhesive strip (e.g., double-sided tape), a liquid adhesive, epoxy, self-tapping screws, or other fastener(s).

The second planar flange 1104 may have a surface treatment, finish, color, effect, or other property to increase a visibility of the cable raceway to which the visibility clip 1100 is coupled and/or of the cable raceway assembly of which the visibility clip 1100 is a part. In some embodiments, each visibility clip 1100 includes a surface (e.g., in FIGS. 11A-11B, a rear facing surface of the second planar flange 1104) that faces a direction from which passersby are expected to approach. In some embodiments, each visibility clip 1100 includes a surface (e.g., in FIGS. 11A-11B, the rear facing surface of the second planar flange 1104) that exhibits a retroreflective effect, such as by inclusion of a reflector on the surface. In some embodiments, each visibility clip 1006 includes a surface (e.g., in FIGS. 11A-11B, the rear facing surface of the second planar flange 1104) having a neon yellow color, a neon green color, a neon orange color, a neon red color, or other color that is likely to visually attract the attention of pedestrians, vehicle drivers, and/or other individuals approaching and/or passing over the corresponding cable raceways or cable raceway assemblies.

Figure 12:
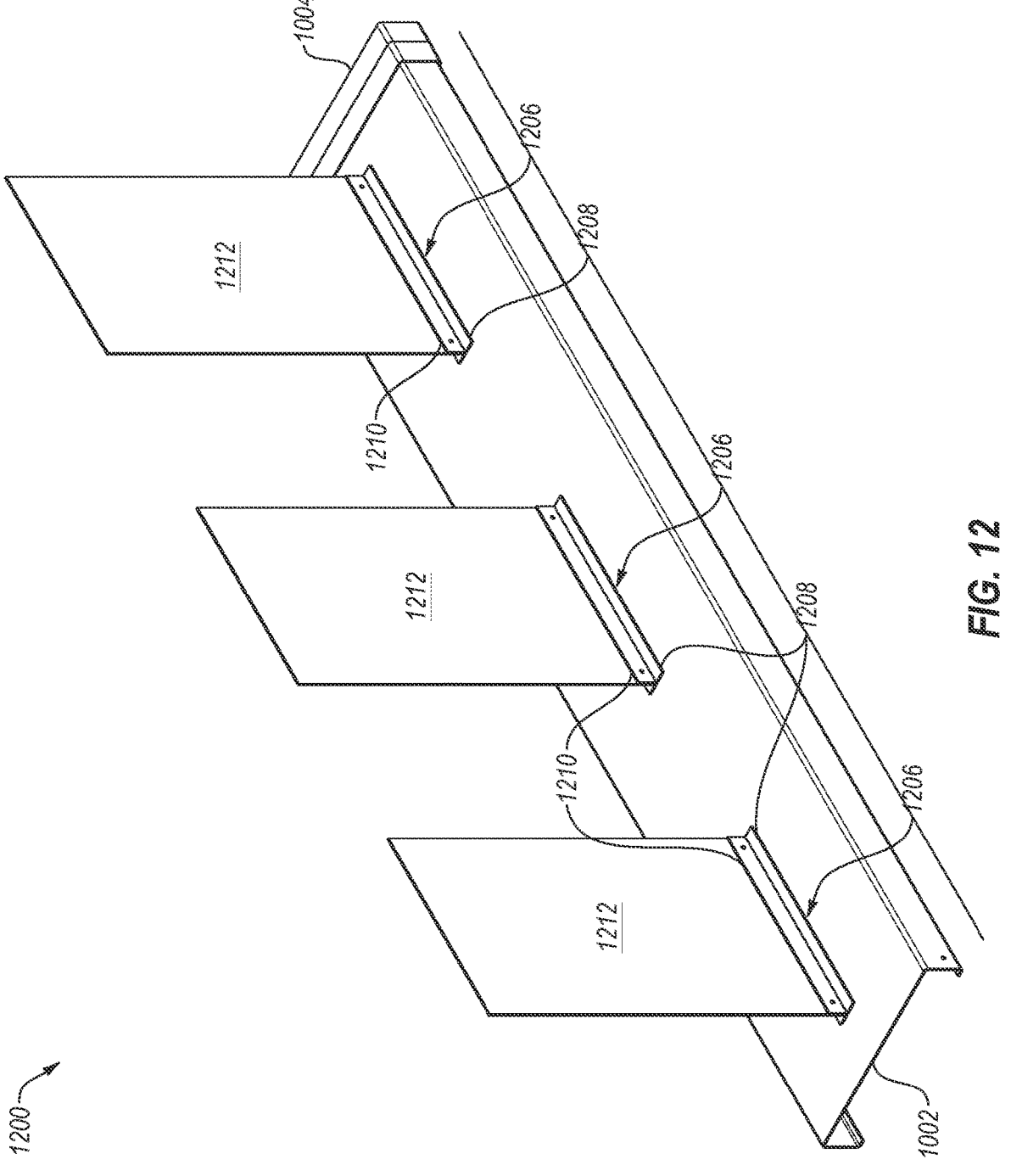
FIG. 12 is a perspective view of another example cable raceway assembly that may be included in the EV charger system of FIG. 1A and/or the PV system of FIG. 1B.

FIG. 12 is a perspective view of another example cable raceway assembly 1200 that may be included in the EV charger system 100 of FIG. 1A and/or the PV system 150 of FIG. 1B, arranged in accordance with at least one embodiment described herein. Alternatively or additionally, the cable raceway assembly 1200 may be included in any of the cable management systems described herein, such as the system 200. In some embodiments, the cable raceway assembly 1200 may include, be included in, or correspond to one or more cable raceways described herein, such as the cable raceway 206.

The cable raceway assembly 1200 includes one or more cable raceways 1002, one or more raceway joints 1004, and visibility clips 1206. The cable raceway 1002 and the raceway joint 1004 are the same as in FIGS. 10A-10C. The visibility clips 1206 are another example of visibility clips that may be implemented in any of the systems and assemblies described herein (e.g., instead of or in addition to the visibility clips 1006). Each visibility clip 1206 includes a first planar flange 1208 coupled to, extending from, and/or integrally formed with a second planar flange 1210. Each visibility clip 1206 additionally includes a visibility flag 1212 The first planar flange 1208 may be coupled to a corresponding one of the cable raceways 1002 and/or raceway joints 1004 using an adhesive strip (e.g., double-sided tape), liquid adhesive, epoxy, self-tapping screws, nuts and bolts, and/or other fasteners. The second planar flange 1210 may be coupled to the visibility flag 1212 using an adhesive strip (e.g., double-sided tape), liquid adhesive, epoxy, self-tapping screws, nuts and bolts, and/or other fasteners.

The visibility clips 1206, including visibility flags 1212, may create an implied barrier to prevent people from stepping on the cable raceway assembly 1200 while walking over it. In some embodiments, each visibility flag 1212 exhibits a retroreflective effect, e.g., includes a reflector or reflective material. In some embodiments, each visibility flag 1212 is a neon yellow color, a neon green color, a neon orange color, a neon red color, or other color that is likely to visually attract the attention of pedestrians, vehicle drivers, and/or other individuals approaching and/or passing over the cable raceways 1002 or cable raceway assembly 1200.

Figure 13A:
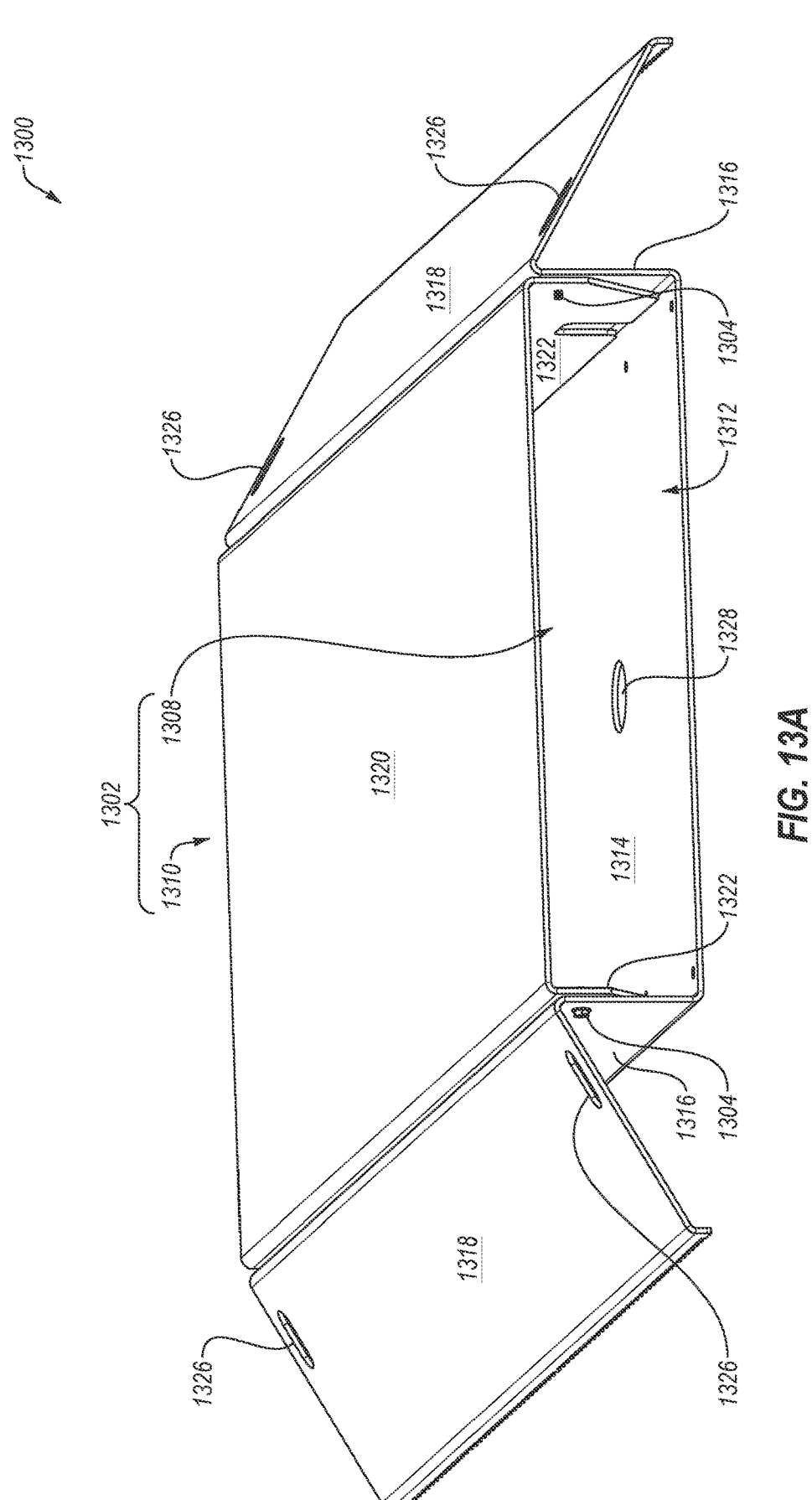
FIGS. 13A-13C illustrate another example cable raceway assembly that may be included in the EV charger system of FIG. 1A and/or the PV system of FIG. 1B.
Figure 13B:
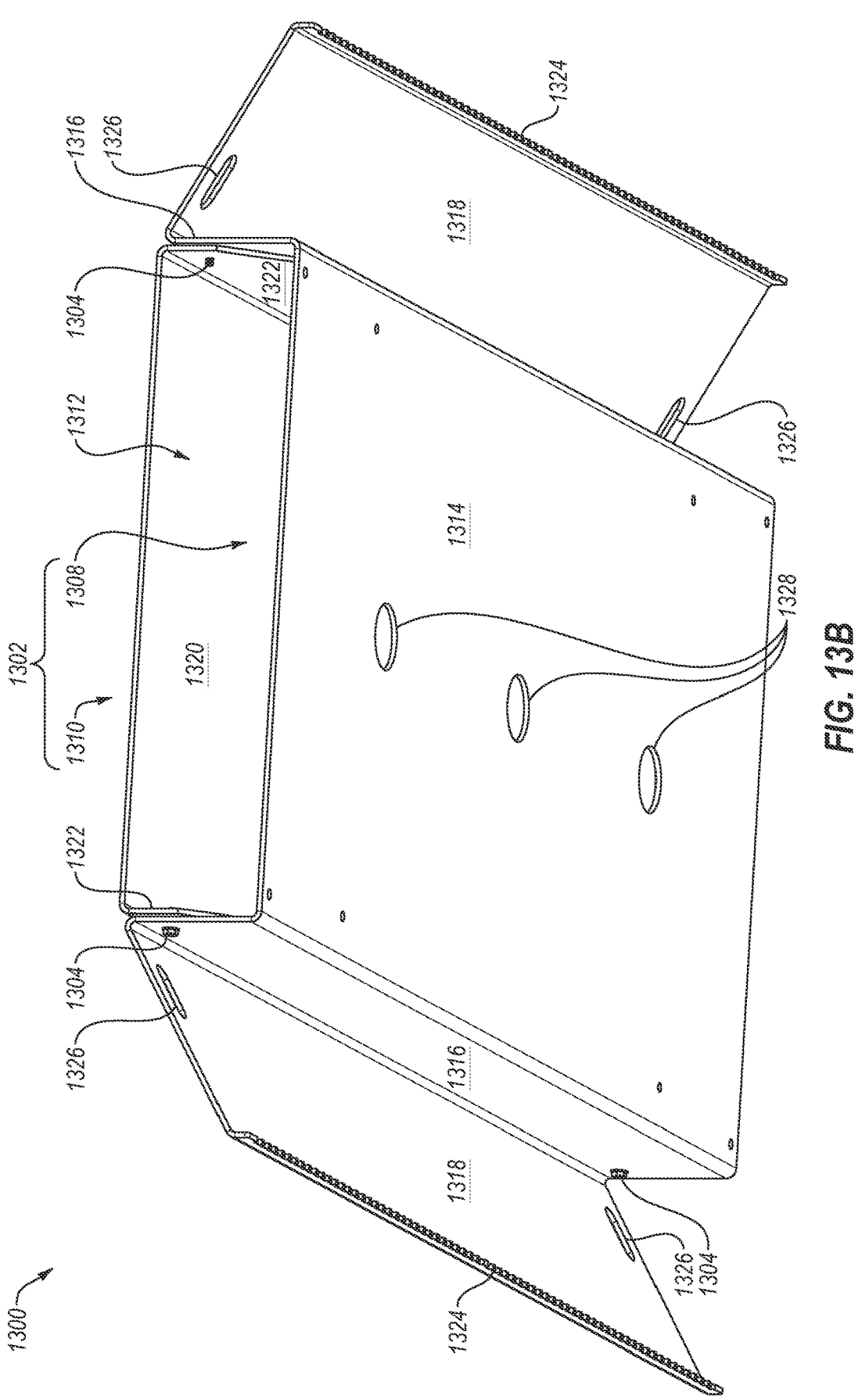
Figure 13C:
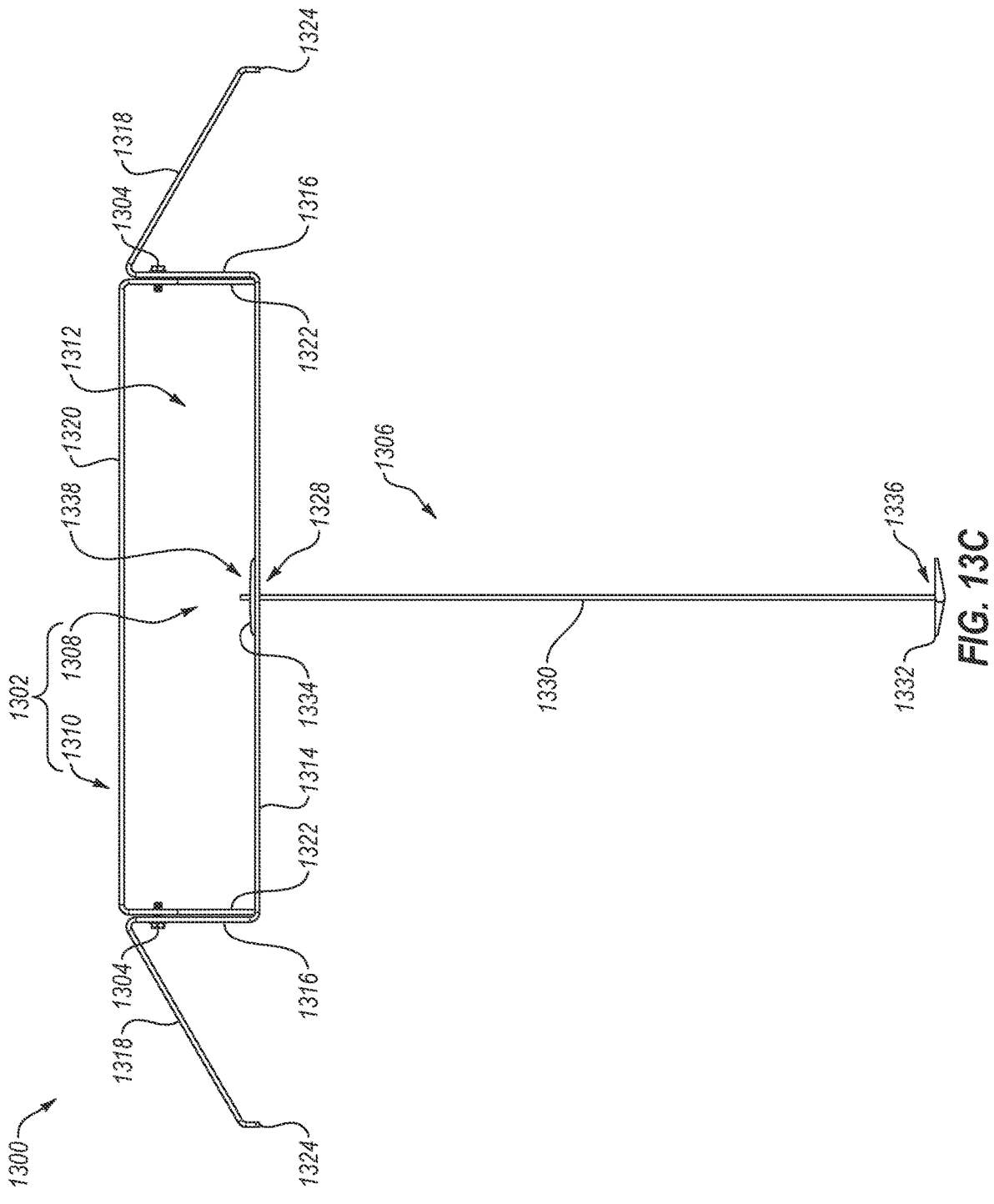

FIGS. 13A-13C illustrate another example cable raceway assembly 1300 that may be included in the EV charger system 100 of FIG. 1A and/or the PV system 150 of FIG. 1B, arranged in accordance with at least one embodiment described herein. Alternatively or additionally, the cable raceway assembly 1300 may be included in any of the cable management systems herein, such as the system 200. In some embodiments, the cable raceway assembly 1300 may include, be included in, or correspond to one or more cable raceways described herein, such as the cable raceway 206. FIG. 13A is a top front perspective view of the cable raceway assembly 1300. FIG. 13B is a bottom front perspective view of the cable raceway assembly 1300. FIG. 13C is a front view of the cable raceway assembly 1300.

In the illustrated embodiment, the cable raceway assembly 1300 includes a cable raceway 1302 and fasteners 1304. FIG. 13C additionally illustrates one or more anchor fasteners 1306 that may be included in the cable raceway assembly 1300. The cable raceway 1302 is different from other cable raceways herein in that it includes two components as opposed to one, e.g., a baseplate 1308 and a cover 1310. More generally, the cable raceways according to embodiments herein may include any number of components, such as one component, two components, or more than two components.

The cover 1310 may physically engage with the baseplate 1308. For example, the cover 1310 may physically engage with the baseplate 1308 within at least a portion of an opening 1312 defined by the baseplate 1308. As another example, the cover 1310 may slide into the opening 1312. The cover 1310 and the baseplate 1307 may be coupled together in some embodiments using the fasteners 1304. Alternatively or additionally, the fasteners 1304 may electrically couple the cover 1310 and the baseplate 1308, providing a grounding effect.

The baseplate 1308 and the cover 1310 may be load bearing to permit vehicular travel or other travel along or loads upon a top of the cable raceway 1302. For example, the cable raceway 1302 may permit an automobile, a truck, a vehicle, a human, or other transportation device to traverse and/or be supported by the top of the cable raceway 1302.

The baseplate 1308 may include a base wall 1314, sidewalls 1316, and ramps 1318. The cover 1310 may include a base wall 1320 and sidewalls 1322. The width of the cover 1310, and specifically of the base wall 1320, may be slightly less than the width of the base wall 1314 of the baseplate 1308 to accommodate the sidewalls 1322 of the cover 1310 between and adjacent to the sidewalls 1316 of the baseplate 1308.

The ramps 1318 may be sloped to facilitate passage of wheeled vehicles across the top of the cable raceway 1302. In some embodiments, the ramps 1318 have a serrated bottom edge 1324 to increase friction between the ramps 1318 and an installation surface or structure. Alternatively or additionally, the ramps 1318 may define one or more openings 1326 through which the fasteners 1304 may be accessed, e.g., during assembly and/or disassembly. When assembled, the fasteners 1304 may electrically and/or mechanically couple the sidewalls 1316 of the baseplate 1308 to the sidewalls 1322 of the cover 1310.

The base wall 1314 of the baseplate 1308 may define one or more anchor openings 1328 which may be configured to interface with an anchor fastener, such as the anchor fastener 1306 of FIG. 13C, to secure the cable raceway assembly 1300 to the installation surface and prevent, or at least reduce, movement of the cable raceway assembly 1300 relative to the installation surface. In some embodiments, the anchor fastener 1306 may include an earth screw. FIG. 13B depicts three anchor openings 1328 defined in the base wall 1314 of the baseplate 1308. More generally, the base wall 1314 may define one or more anchor openings, such as one, two, three, or four anchor openings or even more anchor openings.

The anchor fastener 1306 may include a connector 1330, an anchor 1332, and a cap 1334. In some embodiments, the connector 1330 may include a cable, a rod, or some combination thereof. The anchor 1332 may include a toggle lock anchor or toggle lock screw. In some embodiments, the anchor 1332 may pin the cable raceway 1300 to the installation surface to prevent movement of the cable raceway 1300 relative to the installation surface.

The anchor 1332 may be driven into the installation surface to a particular depth. In some embodiments, the particular depth may be equal to or between six inches and twenty-four inches. The anchor 1332 while being driven may be in a closed state. In addition, the anchor 1332, as illustrated in FIG. 13C, may transition to an open state at the particular depth. For example, the connector 1330 may be drawn toward the installation surface, which may cause wings of the anchor 1332 to extend out and prevent the anchor 1332 and/or the connector 1330 from moving towards the installation surface. As another example, the connector 1330 may be mechanically coupled to a threaded portion of the anchor 1332 and the connector 1330 may be rotated to extend the wings of the anchor 1332 out. The cap 1334 may be sized and shaped to prevent the cap 1334 from passing through the anchor opening 1328. For example, the cap 1334 may be oversized compared to the anchor opening 1328. As another example, the cap 1334 may be shaped differently than the anchor opening 1328 (e.g., a square shape compared to a circular shape).

An example in which the connector 1330 includes a cable will now be discussed. The anchor 1332 may be mechanically coupled to a first end 1336 of the connector 1330. The anchor 1332 may be driven into the installation surface to the particular depth, which may cause a portion of the connector 1330 to also be driven into the installation surface. A second end 1338 of the connector 1330 may extend above the installation surface and pass through the anchor opening 1328. The second end 1338 may physically engage the cap 1334 to tension the connector 1330 (e.g., cause the connector 1330 to be taught). The tension on the connector 1330 may draw the cap 1334 towards the baseplate 1308 (e.g., the base wall 1314). In addition, the cap 1334 may apply a force on the base wall 1314 to draw the cable raceway 1300 towards the installation surface. In some embodiments, the cap 1334 may draw the cable raceway 1300 towards the installation surface to cause the serrated bottom edges 1324 of the ramps 1318 to interface with the installation surface.

An example in which the connector 1330 includes a rod will now be discussed. The anchor 1332 may be mechanically coupled to the first end 1336 of the connector 1330. The connector 1330, the anchor 1332, or some combination thereof may be driven into the installation surface to the particular depth. The second end 1338 of the connector 1330 may extend above the installation surface and may include a connection portion, such as a threaded portion or a press fit portion. The second end 1338 of the connector 1330 may pass through the anchor opening 1328. The cap 1334 may include a fastener, such as a threaded fastener or a press-fit fastener, that interfaces with the connection portion of the second end 1338. The cap 1334 may attach to the connection portion of the second end 1338 to draw the cap 1334 towards the baseplate 1308 (e.g., the base wall 1314). In addition, the cap 1334 may apply a force on the base wall 1314 to draw the cable raceway 1300 towards the installation surface. In some embodiments, the cap 1334 may draw the cable raceway 1300 towards the installation surface to cause the serrated bottom edges 1324 of the ramps 1318 to interface with the installation surface.

The particular depth may be based on a material type of the installation surface. For example, the particular depth may be greater if the material type includes a loose soil compared to an asphalt material or cement material.

Figure 14:
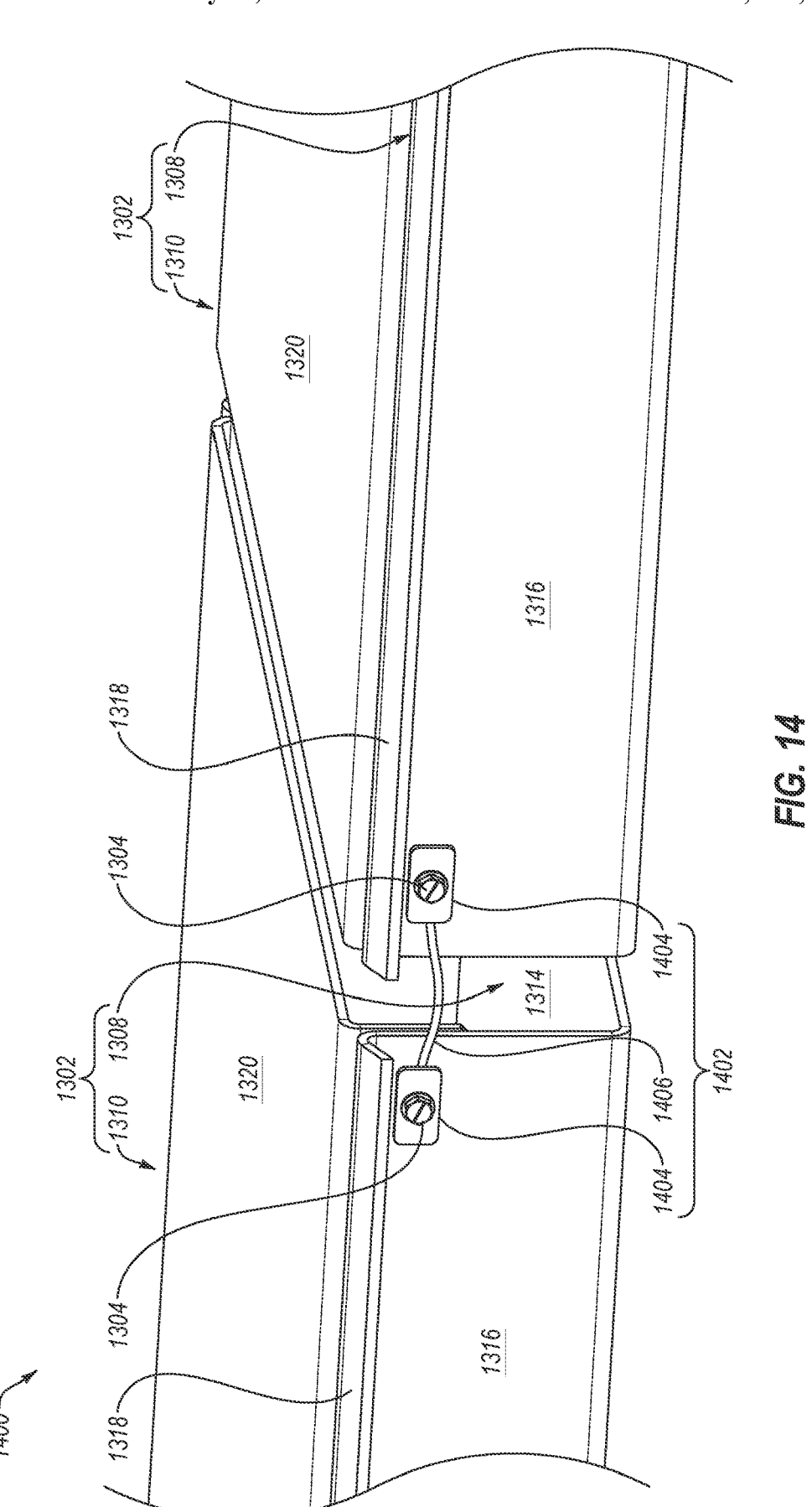
FIG. 14 illustrates another example cable raceway assembly that may be included in the EV charger system of FIG. 1A and/or the PV system of FIG. 1B.

FIG. 14 is a perspective cross-sectional view of another example cable raceway assembly 1400 that may be included in the EV charger system 100 of FIG. 1 and/or the PV system 150 of FIG. 1B, arranged in accordance with at least one embodiment described herein. Alternatively or additionally, the cable raceway assembly 1400 may be included in any of the cable management systems herein, such as the system 200. In some embodiments, the cable raceway assembly 1400 may include, be included in, or correspond to one or more cable raceways described herein, such as the cable raceway 206.

The cable raceway assembly 1400 includes cable raceways 1302 arranged end-to-end and electrically coupled together using a conductive bonding whip 1402 (hereinafter "whip 1402"). The whip 1402 includes conductive terminals 1404 coupled together by a conductive connector 1406. A first end of the whip 1402 that includes one of the conductive terminals 1404 is coupled to one of the cable raceways 1302 by one of the fasteners 1304, an example of which is a bonding screw. A second end of the whip 1402 (opposite the first end) that includes the other of the conductive terminals 1404 is coupled to the other of the cable raceways 1302 by another one of the fasteners 1304, e.g., by another bonding screw. Although not depicted in FIG. 14, the cable raceway assembly 1400 may further include a raceway joint or other raceway-to-raceway transition component.

Figure 15A:
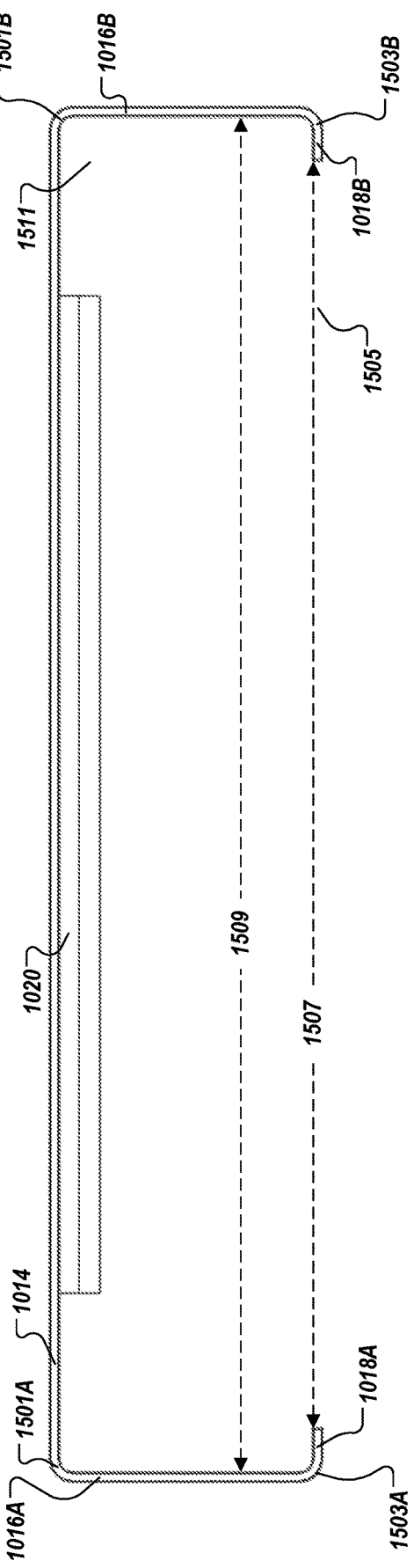
FIGS. 15A-15C illustrate an example raceway joint that may be included in the cable raceway assembly of FIGS. 10A-10C, all arranged in accordance with at least one embodiment described herein.
Figure 15B:
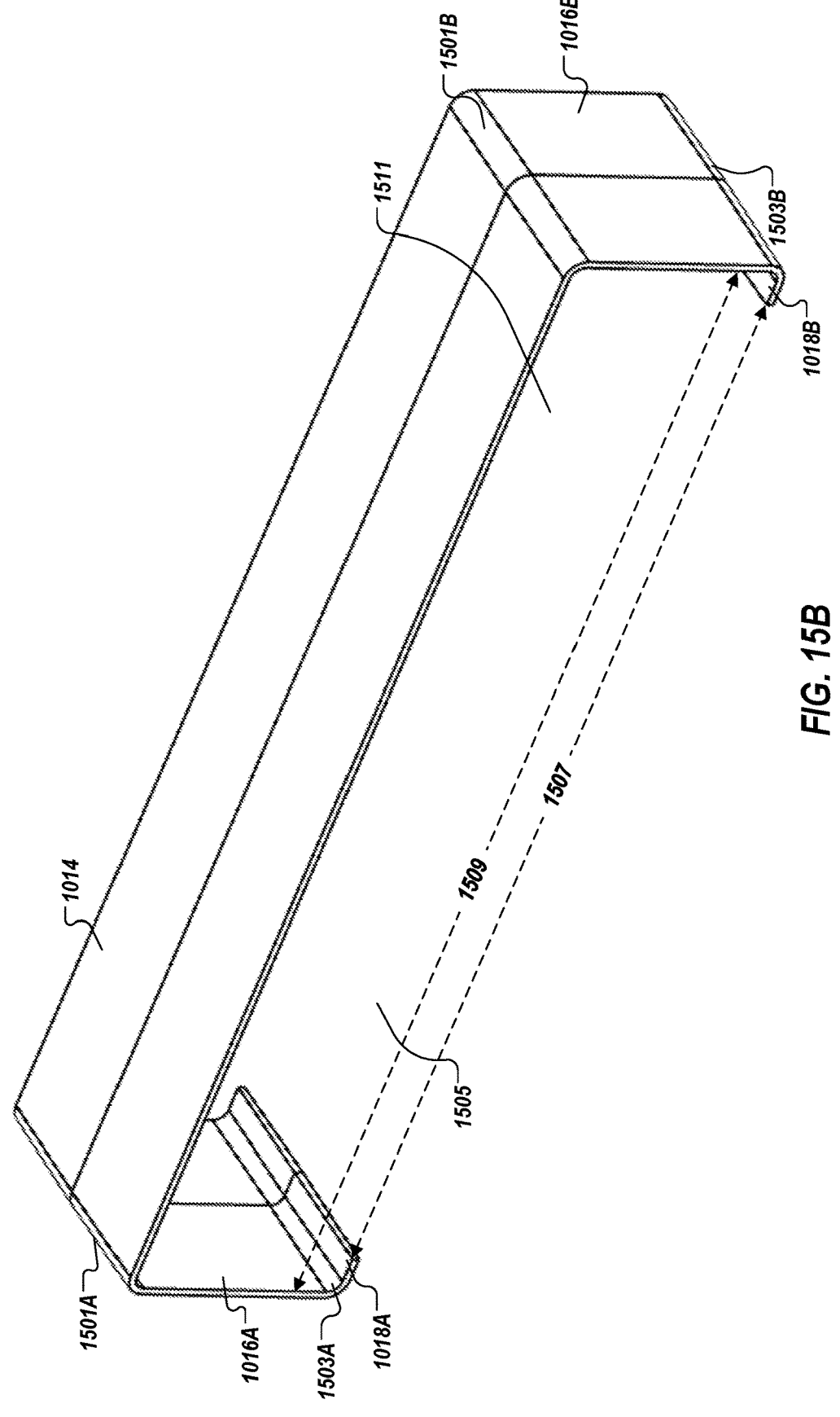
Figure 15C:
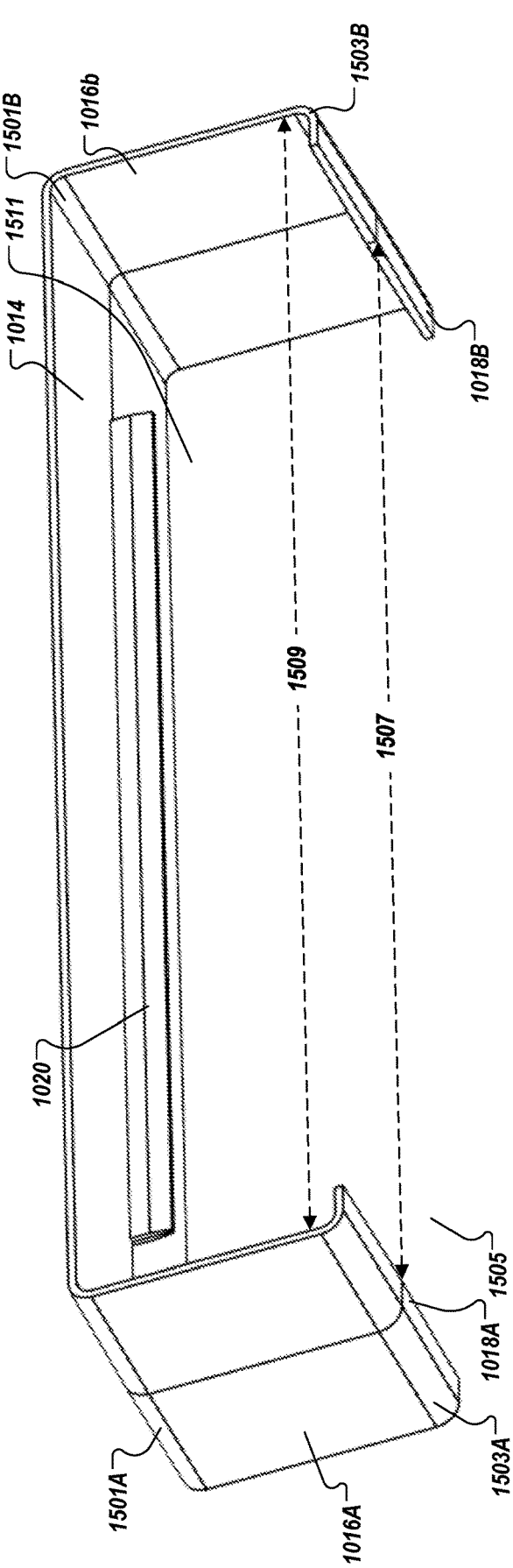

FIGS. 15A-15C illustrate an example of the raceway joint 1004 that may be included in the cable raceway assembly 1000 of FIGS. 10A-10C, arranged in accordance with at least one embodiment described herein. In particular, FIG. 15A illustrates a front view of the raceway joint 1004, FIG. 15B illustrates a top perspective view of the raceway joint 1004, and FIG. 15C illustrates a bottom perspective view of the raceway joint 1004.

The raceway joint 1004 may be sized, shaped, and/or formed to mate with ends of the cable raceways 1002. For example, a width of the raceway joint, a height of the raceway joint, or both may be greater than a width or a height of the cable raceways 1002 so that the ends of the cable raceways 1002 are surrounded by the raceway joint 1004 when installed.

The raceway joint 1004 may include the first joint sidewall 1016A that is coupled to the base wall 1014 to form a first joint 1501A. The raceway joint 1004 may also include the second joint sidewall 1016B that is coupled to the base wall 1014 to form a second joint 1501B. The first joint 1501A and the second joint 1501B may be generally referred to herein as a first set of joints 1501.

The raceway joint 1004 may include the first joint retention flange 1018A that is coupled to the first joint sidewall 1016A to form a first distal joint 1503A. The first joint retention flange 1018A may extend from the first joint sidewall 1016A. Further, the raceway joint 1004 may include the second joint retention flange 1018B that is coupled to the second joint sidewall 1016B to form a second distal joint 1503B. The second joint retention flange 1018B may extend from the second joint sidewall 1016B. The first distal joint 1503A and the second distal joint 1503B may be generally referred to herein as a second set of joints 1503.

In some embodiments, the joint retention flanges 1018 may extend from the joint sidewalls 1016 and toward each other and/or other joint sidewalls 1016. For example, the first joint retention flange 1018A may extend from the first joint sidewall 1016A towards the second joint sidewall 1016B and/or the second joint retention flange 1018B. As another example, the second joint retention flange 1018B may extend from the second joint sidewall 1016B towards the first joint sidewall 1016A and/or the first joint retention flange 1018A.

The joint retention flanges 1018 may extend from the joint sidewalls 1016 and toward each other in directions that are substantially parallel to the base wall 1014 along a width of the base wall 1014. As used in the present disclosure, the term "substantially parallel" may mean two items extend in directions that are parallel relative to each other or are within a range of plus fifteen degrees to minus fifteen degrees of parallel relative to each other. Alternatively, the joint retention flanges 1018 may extend from the joint sidewalls 1016 and toward each other and toward the base wall 1014.

The raceway joint 1004 may include the raceway separator 1020 (illustrated in FIGS. and 15C) coupled to the base wall 1014. The raceway separator 1020 may extend from the base wall 1014 into a raceway opening 1511. The raceway separator 1020 may extend from the base wall 1014 in a direction substantially normal to the base wall 1014. As used in the present disclosure, the term "substantially normal" may mean two items extend in directions that are normal relative to each other or are within a range of plus fifteen degrees to minus fifteen degrees of normal relative to each other.

The raceway separator 1020 may extend a portion of a length of the base wall 1014. Alternatively, the raceway separator 1020 may extend an entire distance 1509 between the first joint sidewall 1016A and the second joint sidewall 1016B (e.g., an entire length of the base wall 1014). In some embodiments, the raceway separator 1020 may be coupled to the first joint sidewall 1016A, the second joint sidewall 1016B, or both. Alternatively, the raceway separator 1020 may interface with or be positioned proximate the first joint sidewall 1016A, the second joint sidewall 1016B, or both. A length of the distance 1509 may correspond to a width of the cable raceways 1002.

The base wall 1014, the joint sidewalls 1016, the joint retention flanges 1018, or some combination thereof may at least partially define the raceway opening 1511. The raceway opening 1511 may be configured to receive the cable raceways 1002 to position the raceway joint 1004 relative to the cable raceways 1002. The raceway joint 1004 may interface with the cable raceways 1002 to prevent the raceway joint 1004 from moving relative to the cable raceways 1002. In particular, the joint retention flanges 1018 may interface with the cable raceways 1002 to prevent the raceway joint 1004 from moving along a direction that is substantially parallel to the joint sidewalls 1016 (vertical dimension in FIGS. 10B and 15A). The joint retention flanges 1018, when the raceway joint 1004 is installed, may mate with surfaces of the retention flanges 1012 of the cable raceways 1002. The base wall 1014, when the raceway joint 1004 is installed, may mate with surfaces of the base wall 1008 of the cable raceways 1002.

The joint sidewalls 1016 may interface with the cable raceways 1002 to prevent the raceway joint 1004 from moving relative to the cable raceways 1002. The joint sidewalls 1016, when the raceway joint 1004 is installed, may prevent the raceway joint 1004 from moving along a width of the cable raceways 1002 (e.g., side to side). The joint sidewalls 1016, when the raceway joint 1004 is installed, may mate with surfaces of the sidewalls 1010 of the cable raceways 1002.

The raceway joint 1004 may interface with the cable raceways 1002 to prevent the raceway joint 1004 from being removed from the cable raceway assembly 1000 and exposing cables routed in an internal volume of the cable raceway assembly 1000. The raceway joint 1004 may interface with the cable raceways 1002 to define a channel to receive and manage cables (e.g., feeder cables 210). For example, the joint sidewalls 1016, the base wall 1014, the joint retention flanges 1018, or some combination thereof may interface with the cable raceways 1002 to define the channel.

The raceway separator 1020 may interface with the cable raceways 1002 to prevent the raceway joint 1004 from moving relative to the cable raceways 1002. The raceway separator 1020, when the raceway joint 1004 is installed, may prevent the raceway joint 1004 from moving relative to the cable raceways 1002 (into or out of the page of FIG. 15A). In some embodiments, the raceway separator 1020 may interface with the cable raceways 1002 to prevent the raceway joint 1004 from moving along a length of the cable raceways 1002.

The raceway separator 1020 may interface with the cable raceways 1002 to prevent the cable raceways 1002 from being inserted into the raceway opening 1511 beyond a point along a width of the base wall 1014. As discussed above in relation to FIG. 10C, the raceway separator 1020 may act as a stop to prevent either cable raceway 1002 from being inserted into the raceway joint 1004 beyond a halfway point of the raceway joint 1004. Alternatively, the raceway separator 1020 may be positioned offset from a center of the width of the base wall 1014 to permit one cable raceway 1002 to be inserted more than another cable raceway 1002.

The cable raceways 1002 may be configured to be installed proximate to each other such that a gap forms between the cable raceways 1002. The raceway joint 1004 may interface with the cable raceways 1002 to extend across and cover the gap formed by the cable raceways 1002 (e.g., between the cable raceways 1002). In particular, the base wall 1014, the joint sidewalls 1016, the joint retention flanges 1018, or some combination thereof may be configured to cover at least a portion of the gap between the cable raceways 1002. As discussed above, the raceway joint 1004 is configured to join, bridge, couple, or otherwise transition between two cable raceways 1002 positioned end-to-end and/or to terminate a cable raceway 1002. In some embodiments, the raceway separator 1020, when the raceway joint 1004 is installed, may extend through at least a portion of the gap formed by the cable raceways 1002.

The raceway joint 1004 may interface with the cable raceways 1002 to prevent the raceway joint 1004 from being removed from the cable raceway assembly 1000 when installed. For example, when the cable raceway assembly 1000 is attached to a surface, the first joint retention flange 1018A, the second joint retention flange 1018B, or some combination thereof may prevent the raceway joint 1004 from being removed from the cable raceway assembly 1000.

The joint retention flanges 1018 may define a retention opening 1505. The retention opening 1505 may include a length 1507 that is less than a width of the cable raceways 1002. In some embodiments, the retention opening 1505 may further define the channel to receive the cable, the raceway opening 1511, or both.

During installation of the raceway joint 1004 (e.g., installation of the cable raceway assembly 1000), the first set of joints 1501, the joint sidewalls 1016, the second set of joints 1503, the base wall 1014, or some combination thereof may resiliently deform (e.g., bend, flex, or otherwise temporarily deform) to cause the length 1507 of the retention opening 1505 to become greater than the width of the cable raceways 1002 to permit portions of the cable raceways 1002 to pass through the retention opening 1505 and be received by the raceway opening 1511. After the joint retention flanges 1018 clear the cable raceways 1002, the first set of joints 1501, the joint sidewalls 1016, the second set of joints 1503, the base wall 1014, or some combination thereof may at least partially return to their initial state such that the length 1507 is again less than the width of the cable raceways 1002. Additionally or alternatively, the raceway joint 1004 may be configured to be slid onto to the ends of the cable raceways 1002 such that the raceway opening 1511 receives the corresponding end of the cable raceway 1002 that way.

The cable raceways 1002 and the raceway joint 1004 may permit the cable raceway assembly 1000 to be installed above-ground and to function as an above-ground wiring run. The raceway joint 1004 is illustrated in FIGS. 15A-15C as including a rectangular shape for example purposes. The raceway joint 1004 may include any other appropriate shape including a circular shape, a triangular shape, a square shape, or any other appropriate shape.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A raceway joint comprising:
a base wall;
a plurality of sidewalls directly coupled to the base wall, wherein the base wall and the plurality of sidewalls at least partially define a raceway opening configured to receive a plurality of raceways;
a plurality of retention flanges, a different retention flange of the plurality of retention flanges extending from each sidewall of the plurality of sidewalls, the plurality of retention flanges configured to interface with the plurality of raceways to prevent the raceway joint from moving along a direction that is substantially parallel to the plurality of sidewalls; and
a raceway separator extending from the base wall into the raceway opening, the raceway separator configured to interface with the plurality of raceways to prevent the plurality of raceways from being inserted into the raceway opening beyond a point along a width of the base wall and to prevent the raceway joint from moving relative to the plurality of raceways.

2. The raceway joint of claim 1, wherein the raceway separator extends along a portion of a length the base wall.

3. The raceway joint of claim 1, wherein the plurality of retention flanges extend from the plurality of sidewalls toward each other.

4. The raceway joint of claim 3, wherein the plurality of retention flanges extend along directions that are substantially parallel to the base wall.

5. The raceway joint of claim 3, wherein the plurality of retention flanges further extend toward the base wall.

6. The raceway joint of claim 1, wherein the raceway separator extends away from the base wall in a direction that is substantially normal to the base wall.

7. The raceway joint of claim 1, wherein the base wall is configured to cover a portion of a gap at least partially defined by the plurality of raceways.

8. The raceway joint of claim 1, wherein:

the plurality of sidewalls are coupled to the base wall to form a first plurality of joints;

the plurality of retention flanges are coupled to the plurality of sidewalls to form a second plurality of joints;

the plurality of retention flanges at least partially define a retention opening; and one or more of the first plurality of joints, the second plurality of joints, the plurality of sidewalls are configured to resiliently deform to cause a length of the retention opening to increase and become greater than a width of the plurality of raceways to permit portions of the plurality of raceways to pass through the retention opening and the raceway opening to receive the plurality of raceways.

9. The raceway joint of claim 1, wherein the plurality of sidewalls further define the raceway opening.

10. The raceway joint of claim 1, wherein a width and a height of the raceway joint is greater than a width and a height of the plurality of raceways so that ends of the plurality of raceways are surrounded by the raceway joint.

11. A cable management system (CMS) comprising:

a first raceway partially defining a channel configured to receive a cable;

a second raceway configured to be installed proximate the first raceway such that a gap forms between the first raceway and the second raceway and to further define the channel configured to receive the cable; and a raceway joint comprising:

a base wall configured to cover at least a portion of the gap to further define the channel configured to receive the cable;

a plurality of sidewalls coupled to the base wall, wherein the base wall and the plurality of sidewalls at least partially define a raceway opening configured to receive the first raceway and the second raceway;

a plurality of retention flanges extending from the plurality of sidewalls, the plurality of retention flanges configured to mate with a bottom surface of the first raceway and a bottom surface of the second raceway to prevent the raceway joint from moving along a direction that is substantially parallel to the plurality of sidewalls; and a raceway separator extending from the base wall into the raceway opening, the raceway separator configured to interface with the first raceway and the second raceway to prevent the first raceway and the second raceway from being inserted into the raceway opening beyond a point along a width of the base wall and to prevent the raceway joint from moving relative to the first raceway and the second raceway.

12. The CMS of claim 11, wherein the raceway joint is configured to interface with the first raceway and the second raceway to prevent the raceway joint from being removed from the CMS when installed.

13. The CMS of claim 11, wherein the plurality of retention flanges extend from the plurality of sidewalls toward each other in directions that are substantially parallel to the base wall.

14. The CMS of claim 11, wherein the raceway separator extends away from the base wall in a direction that is substantially normal to the base wall.

15. The CMS of claim 11, wherein:

the plurality of sidewalls are coupled to the base wall to form a first plurality of joints;

the plurality of retention flanges are coupled to the plurality of sidewalls to form a second plurality of joints;

the plurality of retention flanges at least partially define a retention opening; and one or more of the first plurality of joints, the second plurality of joints, the plurality of sidewalls are configured to resiliently deform to cause a length of the retention opening to increase and become greater than a width of the first raceway and the second raceway to permit portions of the first raceway and the second raceway to pass through the retention opening and the raceway opening to receive the first raceway and the second raceway.

16. The CMS of claim 11, wherein the plurality of sidewalls further define the raceway opening.

17. The CMS of claim 11, wherein a width and a height of the raceway joint is greater than a width and a height of the first raceway and the second raceway so that ends of the first raceway and the second raceway are surrounded by the raceway joint.

18. The CMS of claim 11, wherein the first raceway, the second raceway, and the raceway joint are configured to permit the CMS to be installed above-ground and to function as an above-ground wiring run.

19. The CMS of claim 11, wherein the plurality of sidewalls further define the channel to receive the cable and extend across and cover a portion of the gap.

20. The CMS of claim 11, wherein a distance between the plurality of sidewalls corresponds to a width of the first raceway and the second raceway.

* * * * *